US012777007B2

(12) United States Patent
Tamayo et al.

(10) Patent No.: US 12,777,007 B2
(45) Date of Patent: Oct. 27, 2026

(54) EVENT REGISTRATION AND PREFERENCES

(71) Applicant: Capital One Services, LLC, McLean, VA (US)

(72) Inventors: Bryan Tamayo, Allen, TX (US); Unique Samantha Carey, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 9 days.

(21) Appl. No.: 18/623,723

(22) Filed: Apr. 1, 2024

(65) Prior Publication Data

US 2025/0310287 A1 Oct. 2, 2025

(51) Int. Cl.

*H04L 51/07* (2022.01)
*G06F 16/955* (2019.01)
*G06F 40/174* (2020.01)

(52) U.S. Cl.

CPC ............ *H04L 51/07* (2022.05); *G06F 16/955* (2019.01); *G06F 40/174* (2020.01)

(58) Field of Classification Search

None
See application file for complete search history.

(56) References Cited

U.S. PATENT DOCUMENTS 9,367,552 B1 * 6/2016 Williams .............. G06F 3/1268
2013/0198598 A1 * 8/2013 Kirsch .................. G06F 16/957 715/224
2013/0212121 A1 * 8/2013 Perelman .............. G06F 40/103 707/769
2018/0039615 A1 * 2/2018 Trivedi ................. G06F 40/221
2019/0087836 A1 * 3/2019 Anbarasan ............ G06F 40/174
2019/0179954 A1 * 6/2019 Mardikar .............. H04W 12/06
2021/0294864 A1 * 9/2021 Bailey ................. G06F 16/9535
2021/0294868 A1 * 9/2021 Bailey ...................... G06F 21/31
2025/0148197 A1 * 5/2025 Weedon ................ G06F 40/174

OTHER PUBLICATIONS

"Configuring Attendee Hub Settings," retrieved from https://support.cvent.com/s/communityarticle/Configuring-Attendee-Hub-Settings on Jan. 23, 2024 (5 pages).

"Using the checkout editor," retrieved from https://help.shopify.com/en/manual/checkout-settings/checkout-extensibility/checkout-editor on Jan. 23, 2024 (6 pages).

* cited by examiner

*Primary Examiner* — Linda Huynh
(74) *Attorney, Agent, or Firm* — Harrity & Harrity, LLP

(57) ABSTRACT

In some implementations, a web server may receive a request associated with a URL that includes an indication of a subset of fields, of a set of fields, and an indication of a user. The web server may generate a registration form that includes the subset of fields and omits remaining fields in the set of fields. The web server may transmit, to a data source, a request for a set of preferences associated with the user and may receive, in response to the request, an indication of the set of preferences. The web server may pre-populate at least one field in the registration form based on the set of preferences, to generate a modified registration form. The web server may transmit, to a user device, the modified registration form and may receive, from the user device, a data structure encoding a completed version of the modified registration form.

20 Claims, 17 Drawing Sheets

100

EVENT REGISTRATION AND PREFERENCES

BACKGROUND

Event platforms, such as Cvent®, allow users to register for conferences and other events over the Internet. However, an event organizer generally has to custom build a registration separately for each event, which consumes power and processing resources at a device used by the event organizer.

SUMMARY

Some implementations described herein relate to a system for event registration based on a uniform resource locator (URL). The system may include one or more memories and one or more processors communicatively coupled to the one or more memories. The one or more processors may be configured to receive, from an administrator device, an indication of a subset of fields, out of a set of fields, associated with an event. The one or more processors may be configured to generate a base URL, wherein the base URL includes a set of parameters that indicate fields in the subset. The one or more processors may be configured to generate, for each user in a plurality of users, a corresponding email message in a plurality of email messages, wherein the corresponding email message includes a modified version of the base URL that is unique to the user. The one or more processors may be configured to transmit the plurality of email messages to an email service for delivery to the plurality of users. The one or more processors may be configured to transmit, to the administrator device, an indication that the plurality of email messages have been sent.

Some implementations described herein relate to a method of event registration based on a URL. The method may include receiving, from a user device and at a web server, a request associated with the URL, wherein the URL includes an indication of a subset of fields, of a set of fields, and an indication of a user associated with the user device. The method may include generating, by the web server, a webpage encoding a registration form for an event, wherein the registration form includes the subset of fields indicated by the URL and omits remaining fields in the set of fields. The method may include transmitting, from the web server and to a data source, a request for a set of preferences associated with the user indicated by the URL. The method may include receiving, from the data source and at the web server, an indication of the set of preferences in response to the request. The method may include pre-populating at least one field, in the subset of fields in the registration form, based on the set of preferences, to generate a modified registration form. The method may include transmitting, to the user device, the webpage encoding the modified registration form. The method may include receiving, from the user device, a data structure encoding a completed version of the modified registration form. The method may include transmitting, from the web server and to a registration service, the data structure. The method may include transmitting, to the user device, an indication that the user is registered for the event.

Some implementations described herein relate to a non-transitory computer-readable medium that stores a set of instructions for securely that stores event registration preferences. The set of instructions, when executed by one or more processors of a device, may cause the device to receive a request for a first set of preferences associated with a first user, wherein the first user is associated with a first alphanumeric indicator indicated in a first URL. The set of instructions, when executed by one or more processors of the device, may cause the device to determine that the first user is an internal user. The set of instructions, when executed by one or more processors of the device, may cause the device to retrieve the first set of preferences from one or more memories based on the first user being an internal user. The set of instructions, when executed by one or more processors of the device, may cause the device to output the first set of preferences in response to the request for the first set of preferences. The set of instructions, when executed by one or more processors of the device, may cause the device to receive a request for a second set of preferences associated with a second user, wherein the second user is associated with a second alphanumeric indicator indicated in a second URL. The set of instructions, when executed by one or more processors of the device, may cause the device to determine that the second user is an external user. The set of instructions, when executed by one or more processors of the device, may cause the device to transmit, to an external database, a query for the second set of preferences based on the second user being an external user. The set of instructions, when executed by one or more processors of the device, may cause the device to receive, from the external database, the second set of preferences in response to the query. The set of instructions, when executed by one or more processors of the device, may cause the device to output the second set of preferences in response to the request for the second set of preferences.

DETAILED DESCRIPTION

The following detailed description of example implementations refers to the accompanying drawings. The same reference numbers in different drawings may identify the same or similar elements.

Event platforms, such as Cvent®, allow users to register for conferences and other events over the Internet. However, an event organizer generally has to custom build a registration separately for each event, which consumes power and processing resources at a device used by the event organizer.

Additionally, an attendee may store preferences with an event platform for later use. However, the preferences are stored remotely from both the attendee and from the event organizer. As a result, security is decreased as well as ability to leverage the preferences to reduce overhead associated with registration for future events.

Some implementations described herein enable generation and use of a uniform resource locator (URL) that indicates a subset of fields, out of a larger set of fields, to use in a registration form. Therefore, a web server may quickly generate the registration form based on the URL. As a result, creating the registration form consumes less power and fewer processing resources at an administrator device, and loading the registration form consumes less power and fewer processing resources at the web server. Additionally, or alternatively, some implementations described herein enable separate storage of preferences associated with internal event attendees and preferences associated with external event attendees. As a result, security is increased. Additionally, the preferences associated with internal event attendees may be used to train internal machine learning models in order to reduce overhead associated with registration for future events.

FIGS. 1A-1H are diagrams of an example 100 associated with event registration. As shown in FIGS. 1A-1H, example 100 includes an administrator device, a registration service, a machine learning (ML) model (e.g., provided by an ML host), an email service, a user device, a web server, and an external storage. These devices are described in more detail in connection with FIGS. 3 and 4.

Figure 1A:
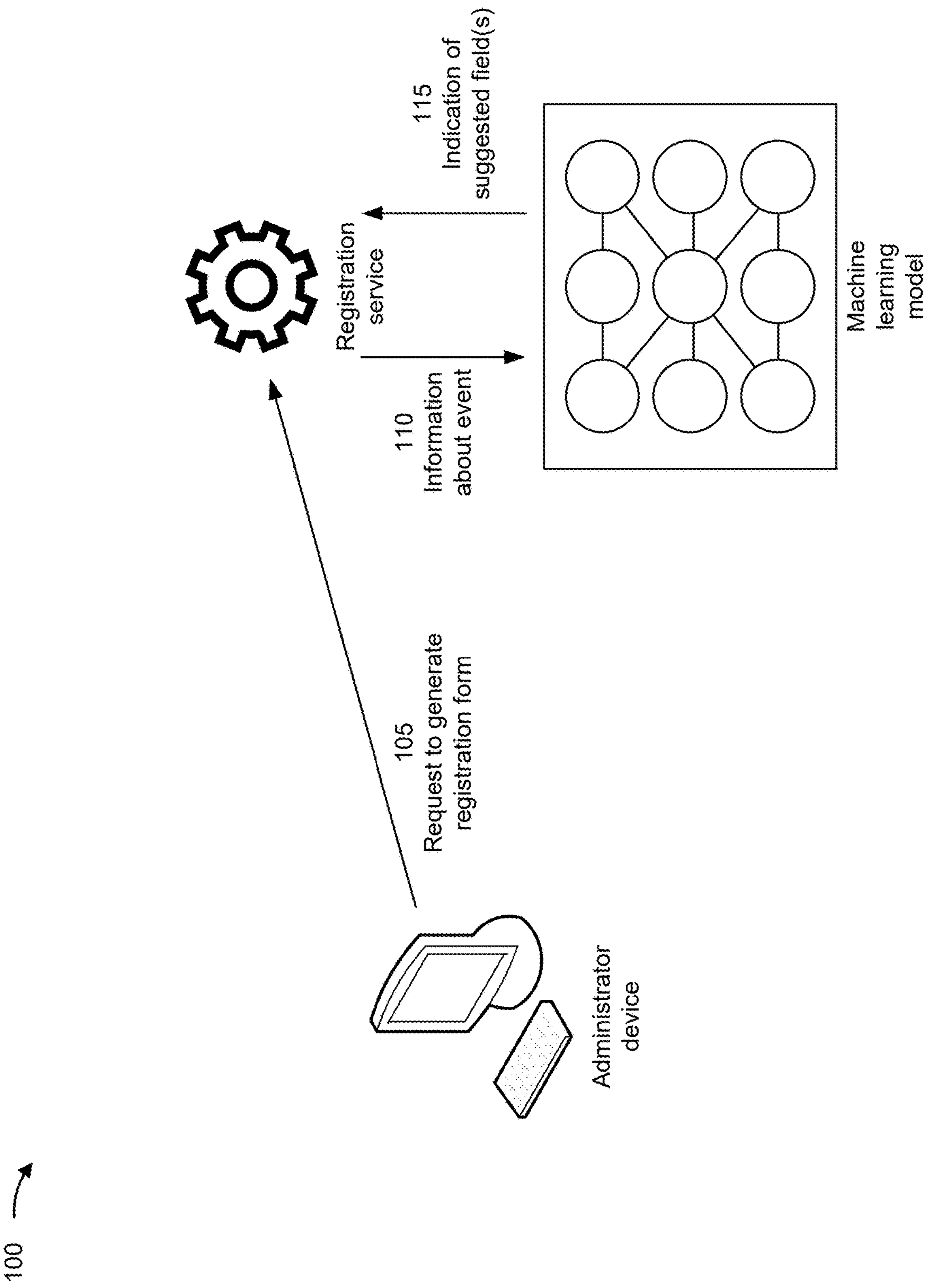
FIGS. 1A-1H are diagrams of an example implementation relating to event registration, in accordance with some embodiments of the present disclosure.

As shown in FIG. 1A and by reference number 105, the administrator device may transmit, and the registration service may receive, a request to generate a registration form for an event. The request may include a hypertext transfer protocol (HTTP) request and/or an application programming interface (API) call, among other examples. The request may include information associated with the event. For example, the request may include a date (or a set of dates) during which the event is schedule, a time (or a set of times) at which the event is scheduled, a location (or a set of locations) at which the event takes place, a title of the event, a string description of the event (e.g., an abstract or a summary, among other examples), a logo associated with the event, a photograph (or a set of photographs) from a previous iteration of the event, and/or a video to promote the event, among other examples.

In some implementations, an administrator using the administrator device may provide input that triggers the administrator device to transmit the request. For example, a web browser (and/or another type of application executed by the user device) may navigate to a website controlled by (or at least associated with) the registration service. Accordingly, the administrator may interact with a user interface (UI) representing the website in order to provide the input to trigger the administrator device to transmit the request to the registration service.

In some implementations, the administrator device may transmit the information associated with the event in a same message as the request. Alternatively, the administrator device may transmit the information associated with the event in a separate message. For example, the administrator device may transmit the request, and the registration service may transmit a prompt for information in response to the request. Accordingly, the administrator device may transmit, and the registration service may receive, the information associated with the event in response to the prompt.

As shown by reference number 110, the registration service may provide the information associated with the event to the ML model. For example, the registration service may transmit, and the ML host may receive, a request including the information.

The ML model may be trained (e.g., by the ML host and/or a device at least partially separate from the ML host) using a labeled set of events (e.g., for supervised learning). Additionally, or alternatively, the ML model may be trained using an unlabeled set of events (e.g., for deep learning). The ML model may be configured to determine whether a field, within a larger set of fields, should be included in a registration form or not (e.g., based on the information associated with the event). Additionally, or alternatively, the ML model may be configured to score each field in the larger set of fields (e.g., based on the information associated with the event). For example, the ML model may determine a probability that the field is relevant (e.g., based on the information associated with the event). Accordingly, the field may be included (or not) in the registration form based on whether the score satisfies an inclusion threshold.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., information about front-end devices). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the registration service, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 115, the registration service may receive an indication of at least one suggested field from the ML model (e.g., from the ML host). The suggested field(s) may be from the larger set of fields. The indication may include an array of indices (and/or other types of indicators) associated with the suggested field(s). Therefore, the suggested field(s) are indicated by inclusion of the indices, associated with the suggested field(s), in the array while remaining fields in the larger set of fields are excluded by virtue of the indices, associated with the remaining fields, being absent from the array. Additionally, or alternatively, the indication may include an array of Booleans (and/or other types of binary variables) associated with the set of fields. Therefore, the suggested field(s) are indicated by positive binary variables (e.g., '1' or TRUE, among other examples) in the array while remaining fields in the larger set of fields are indicated by negative binary variables (e.g., '0' or FALSE, among other examples) in the array. Additionally, or alternatively, the indication may include an array of scores associated with the set of fields. Therefore, the suggested field(s) are indicated by scores in the array that satisfy the inclusion threshold while remaining fields in the larger set of fields are indicated by scores in the array that fail to satisfy the inclusion threshold.

Figure 1B:
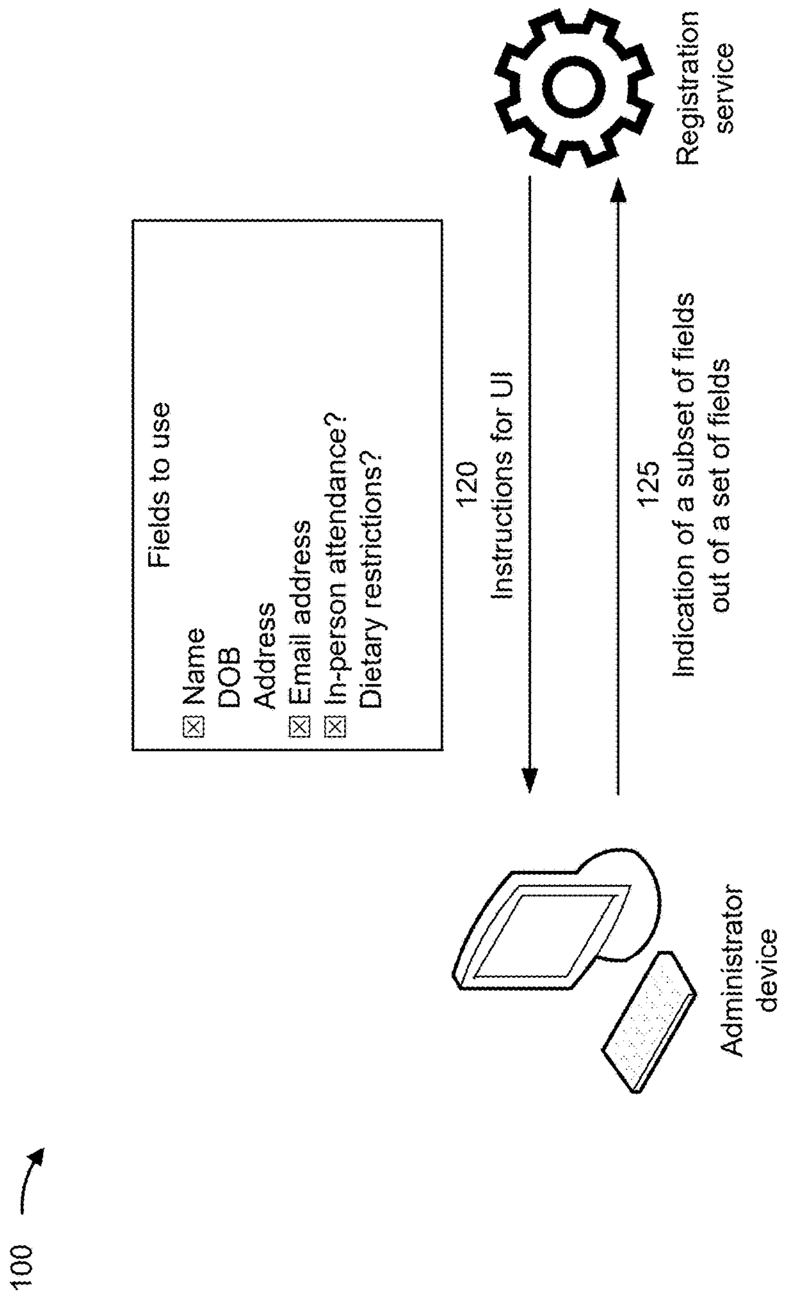

As shown in FIG. 1B and by reference number 120, the registration service may transmit, and the administrator device may receive, instructions for a UI indicating the suggested field(s). In FIG. 1B, an example UI is shown that includes a set of checkboxes, corresponding to the set of fields. Therefore, the registration service may indicate the suggested field(s) by pre-populating at least one checkbox (in the set of checkboxes) corresponding to the suggested field(s). Other examples may include different types of input elements (in addition to, or in lieu of, checkboxes) and/or a different indication of the suggested field(s) (e.g., text indicating the suggested field(s)).

As shown by reference number 125, the administrator device may transmit, and the registration service may receive an indication of a subset of fields, out of the set of fields, associated with the event. In some implementations, the administrator using the administrator device may provide input that triggers the administrator device to transmit the indication of the subset of fields. For example, the administrator may interact with the UI indicating the suggested field(s) in order to provide the input to trigger the administrator device to transmit the indication of the subset of fields to the registration service.

By using the ML model to provide the suggested field(s), the registration service reduces latency in receiving the indication of the subset of fields. For example, by pre-populating the checkbox(es) associated with the suggested field(s), the registration service reduces power and processing resources consumed at the administrator device in selecting the subset of fields.

Figure 1C:
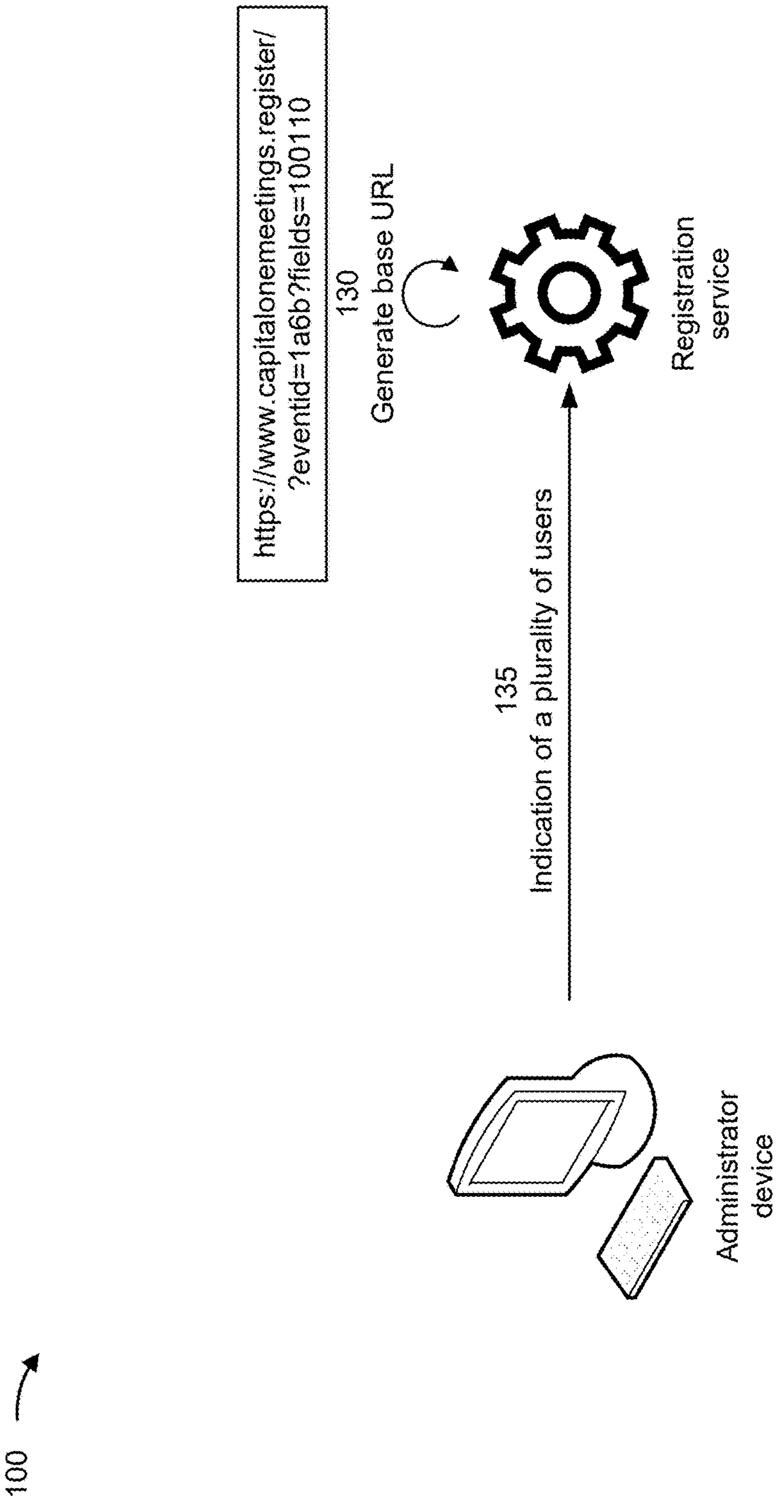

As shown in FIG. 1C and by reference number 130, the registration service may generate a base URL for the event. The base URL may include a set of parameters that indicate fields in the subset. For example, the set of parameters may include indices (and/or other types of indicators) associated with the fields in the subset. In some implementations, the set of parameters further indicate remaining fields, in the set of fields, not associated with the event. For example, the set of parameters may separately include indices (and/or other types of indicators) associated with the remaining fields. Additionally, or alternatively, as shown in FIG. 1C, the set of parameters may include a bit sequence (or another set of bits) that indicate which fields, in the set of fields, are included in the subset.

In some implementations, the registration service may generate the base URL by generating a domain and a page indicator. In some implementations, the registration service may select the domain based on the information associated with the event. For example, the registration service may map a location associated with the event and/or a host associated with the event, as indicated in the information, to the domain (e.g., using a table or another type of relational data structure). The registration service may generate the page indicator as a unique identifier (or at least quasi-unique identifier to the registration service) for the event. The page indicator is shown as eventid in FIG. 1C.

Additionally, the registration service may generate the base URL by appending a slug to the domain and page indicator. The slug may include the set of parameters. The slug includes the set of parameters as fields in FIG. 1C.

As shown by reference number 135, the administrator device may transmit, and the registration service may receive, an indication of the plurality of users. For example, the administrator device may provide a set of usernames, a set of names, a set of email addresses, and/or a set of phone numbers, among other examples. In some implementations, the administrator using the administrator device may provide input that triggers the administrator device to transmit the indication of the plurality of users. For example, the administrator may interact with a UI in order to provide the input to trigger the administrator device to transmit the indication of the plurality of users to the registration service. The UI may be the same UI as indicates the suggested field(s). Accordingly, the administrator device may transmit the indication of the plurality of users in a same message as the indication of a subset of fields (or at least in approximately concurrent messages). Alternatively, the UI may be a different UI. Accordingly, the registration service may transmit (and the administrator device may receive) a prompt in response to the indication of a subset of fields, and the administrator device may transmit (and the registration service may receive) the indication of the plurality of users in response to the prompt.

Figure 1D:
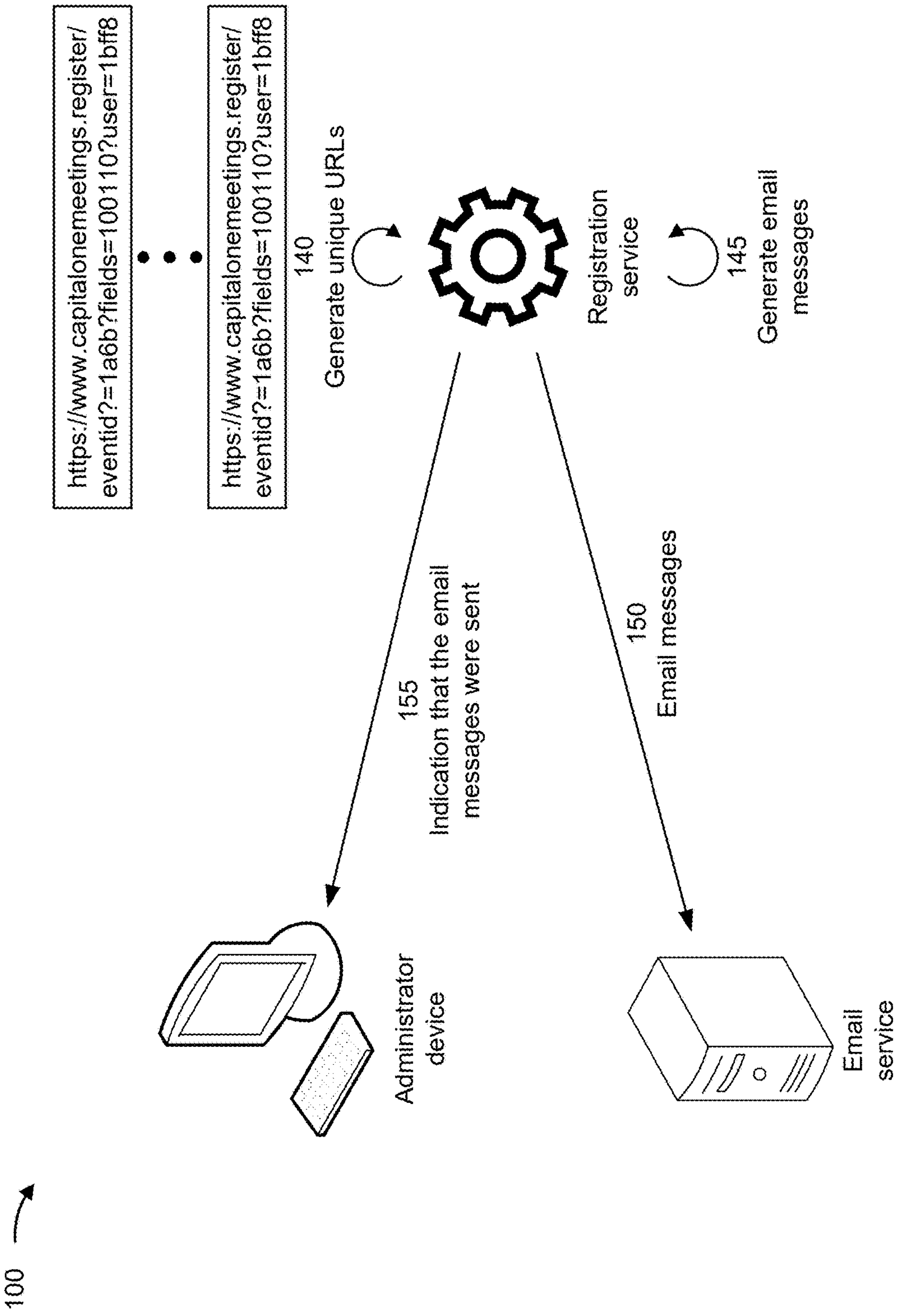

As shown in FIG. 1D and by reference number 140, the registration service may generate a unique URL for each user in the plurality of users. For example, each user may be associated with a modified version of the base URL. The registration service may generate the modified version of the base URL by appending an additional slug. The additional slug may identify the user (e.g., using a unique identifier for the user or at least a quasi-unique identifier for the user relative to the registration service). The slug includes an identifier of the user as user in FIG. 1D. In some implementations, the modified version of the base URL may include an anonymized identifier associated with the user. For example, rather than use a name or another type of identifiable information, the registration service may use an alphanumeric identifier that is linked to the user via a data structure only accessible by the registration service (and, optionally, one or more trusted third-party services).

As shown by reference number 145, the registration service may generate a corresponding email message for each user in the plurality of users. Therefore, each user may be associated with a corresponding email message in a plurality of email messages. In some implementations, the registration service may receive (e.g., from a local memory and/or from a remote storage) a template email message. The template email message may include a subject line and/or a layout for a body (e.g., hypertext markup language (HTML) code and/or cascading style sheets (CSS) code). The registration service may insert the information associated with the event (e.g., a title, a location, a schedule, and/or information about speakers, among other examples) into the subject line and/or the body of the template email message. Additionally, the registration service may insert, into each corresponding email message, the modified version of the base URL that is unique to the user. Therefore, each corresponding email message may include the modified version of the base URL.

As shown by reference number 150, the registration service may transmit, and the email service may receive, the plurality of email messages (for delivery to the plurality of users). For example, the email service may manage a plurality of email addresses (and/or a plurality of accounts) associated with the plurality of users. Therefore, a plurality of user devices, associated with the plurality of users, may receive the plurality of email messages from the email service.

Although the example 100 is described in connection with a single email service, other examples may include a plurality of email services. For example, some users (in the plurality of users) may be associated with a first email service while other users (in the plurality of users) are associated with a second email service. Therefore, the registration service may direct some email messages (in the plurality of email messages) to the first email service and may direct other email messages (in the plurality of email messages) to the second email service.

As shown by reference number 155, the registration service may transmit, and the administrator device may receive, an indication that the plurality of email messages have been sent. For example, the registration service may transmit, and the administrator device may receive, instructions for a UI indicating that the plurality of email messages have been sent. Additionally, or alternatively, the indication may be included in a text message, an email message, and/or a push notification, among other examples.

Figure 1E:
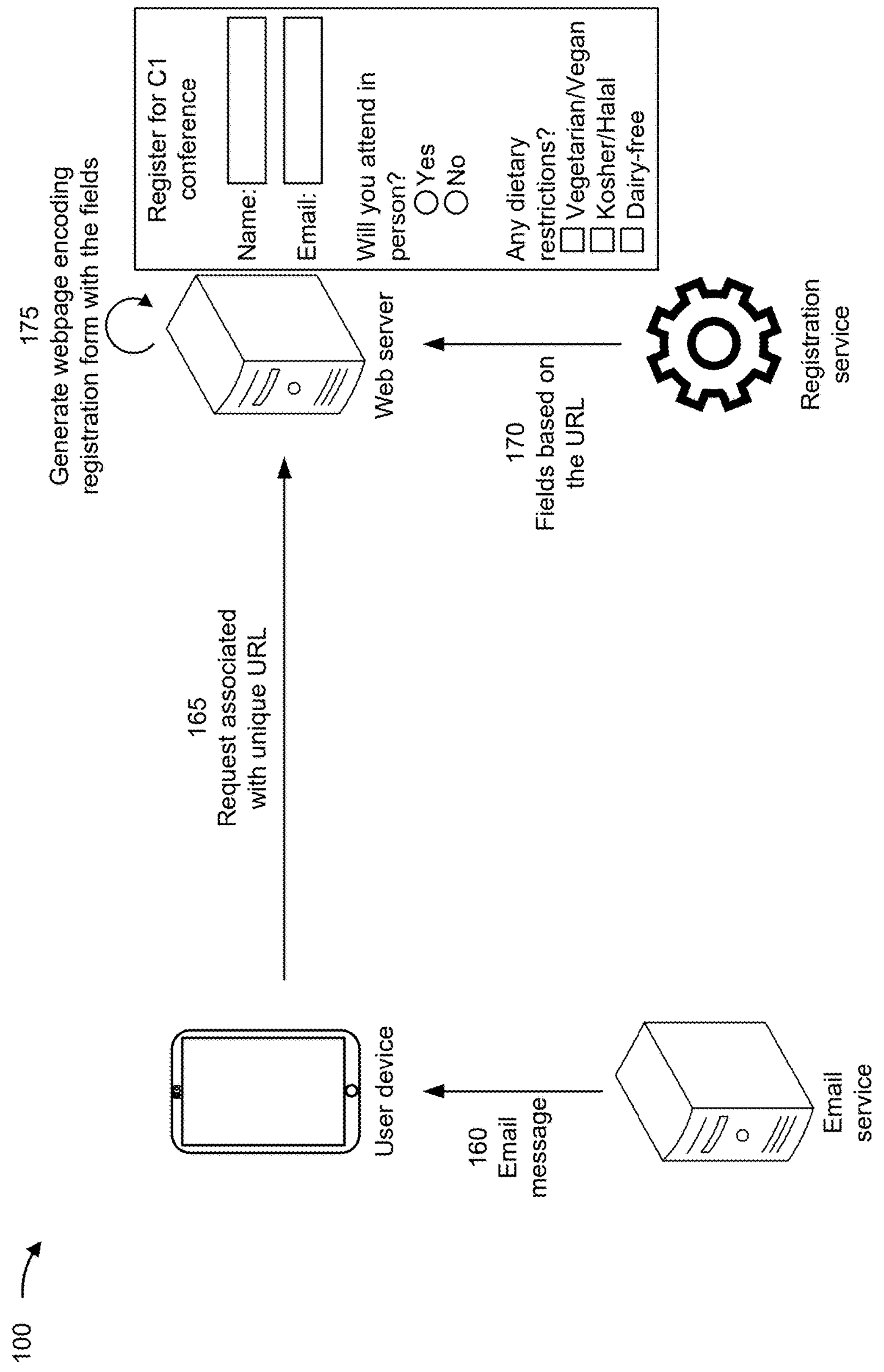

As shown in FIG. 1E and by reference number 160, the email service may transmit, and the user device (associated with a user in the plurality of emails) may receive, the corresponding email message (in the plurality of email messages) associated with the user. For example, the user device may execute Microsoft Outlook®, Apple® Mail, Mozilla Thunderbird®, or another type of email client in order to receive (and output to the user) the corresponding email message. Alternatively, the user device may execute a web browser in order to access a web-based email service (e.g., the Gmail® service or the Outlook on the web service, among other examples) that is used to receive (and output to the user) the corresponding email message.

The user of the user device may interact (e.g., using an input component of the user device) with a URL included in the corresponding email message (e.g., the modified version of the base URL that is unique to the user, as described above). The interaction may trigger the user device to transmit a request associated with the URL. Accordingly, as shown by reference number 165, the user device may transmit, and the web server may receive, the request associated with the URL. The request may include an HTTP request. In some implementations, the user device may resolve the URL (e.g., using a domain name service (DNS) or another type of service) such that the request is addressed to an Internet protocol (IP) address associated with the web server. Accordingly, the web server may be associated with the URL.

As described above, the URL may include an indication of the subset of fields, of the set of fields. Therefore, the web server may use the indication of the subset of fields in responding to the request from the user device. For example, as shown by reference number 170, the registration service may transmit, and the web server may receive, the subset of fields. In some implementations, the web server may transmit, and the registration service may receive, a request for the subset of fields based on the indication in the URL (e.g., the request including the indication); therefore, the registration service may transmit, and the web server may receive, the subset of fields in response to the request from the web server. Alternatively, the web server may determine the subset of fields directly from the indication in the URL without contacting the registration service. For example, the registration service may coordinate with the web server to associate different parameters (some of which are included in the URL, as described above) to different fields in the set of fields.

As shown by reference number 175, the web server may generate a webpage encoding a registration form for the event, and the registration form may include the subset of fields indicated by the URL. In FIG. 1E, the subset of fields includes a text box for a name, a text box for an email address, a set of radio buttons for in person attendance, and a set of checkboxes for dietary restrictions. The registration form may further omit remaining fields in the set of fields.

The web server may, in some implementations, generate executable code (e.g., JavaScript® code) for the webpage to be rendered at the user device. Therefore, the webserver may be configured for client-side rendering. Alternatively, the web server may be configured for server-side rendering. For example, the web server may generate HTML code (optionally with CSS code) for the webpage to be output by the user device (e.g., using an output component of the user device).

Because the URL indicates the subset of fields to use in the registration form, the web server may quickly generate the registration form based on the URL. As a result, loading the registration form consumes less power and fewer processing resources at the web server. Additionally, rendering the webpage encoding the registration form consumes less power and fewer processing resources at the user device.

Figure 1F:
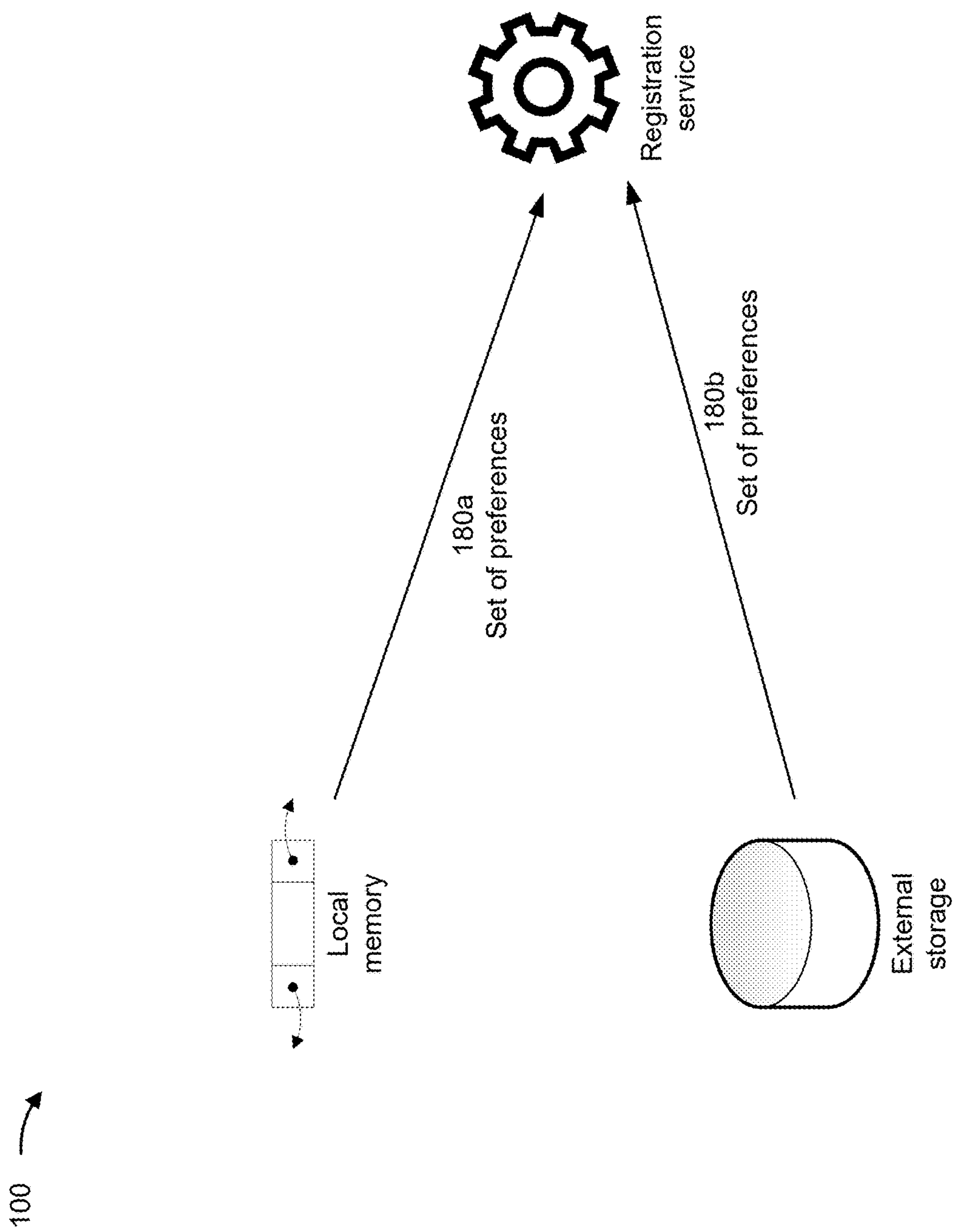

Additionally, as described above, the URL may include an indication of the user associated with the user device. Therefore, the registration service may pre-populate (at least a portion of) the registration form. As shown in FIG. 1F and by reference number 180*a*, a local memory (e.g., a cache and/or another type of memory controlled by the registration service) may transmit, and the registration service may receive, a set of preferences associated with the user. For example, the registration service may transmit, and the local memory may receive, a request for the set of preferences; therefore, the local memory may transmit, and the registration service may receive, an indication of the set of preferences in response to the request. The request may include an HTTP request, a file transfer protocol (FTP) request, and/or an API call, among other examples. The request may include (e.g., in a header and/or as an argument) an identifier associated with the user (e.g., the indication of the user included in the URL). In some implementations, the registration service may determine that the user is an internal user (e.g., using a data structure that maps user identifiers to indications of whether users are internal and/or based on a rule, such as a rule that email addresses with a particular domain name or domain names are associated with internal users). Therefore, the registration service may select the local memory based on the user being an internal user.

Although the example 100 is described in connection with the local memory, other examples may include a different type of data source. For example, the registration service may receive the set of preferences from an external storage associated with internal users. Additionally, or alternatively, the registration service may receive the set of preferences from a data source associated with an ML model that predicts preferences for internal users.

Alternatively, as shown by reference number 180*b*, the external storage may transmit, and the registration service may receive, a set of preferences associated with the user. For example, the registration service may transmit, and the external storage may receive, a request for the set of preferences; therefore, the external storage may transmit, and the registration service may receive, an indication of the set of preferences in response to the request. The request may include an HTTP request, an FTP request, and/or an API call, among other examples. The request may include (e.g., in a header and/or as an argument) an identifier associated with the user (e.g., the indication of the user included in the URL). In some implementations, the registration service may determine that the user is an external user (e.g., using a data structure that maps user identifiers to indications of whether users are external and/or based on a rule, such as a rule that email addresses with domain names outside of an organization are associated with external users). Therefore, the registration service may select the external storage based on the user being an external user.

Although the example 100 is described in connection with the external storage, other examples may include a different type of data source. For example, the registration service may receive the set of preferences from a local memory associated with external users. Additionally, or alternatively, the registration service may receive the set of preferences from a data source associated with an ML model that predicts preferences for external users.

By separating preferences for internal users from external users, security is improved. For example, preferences associated with internal users may be used to train internal ML models while preferences associated with external users are not used for training. In another example, preferences associated with external users may be provided to third-party services as authorized by the external users while preferences associated with internal users are retained as confidential.

Although the example 100 shows the registration service as retrieving the set of preferences, other examples may include the web server retrieving the set of preferences. For example, the web server may be authorized to access preferences for internal users and/or preferences for external users. Additionally, or alternatively, the web server may be at least partially integrated (e.g., logically, virtually, and/or physically) with the registration service.

Figure 1G:
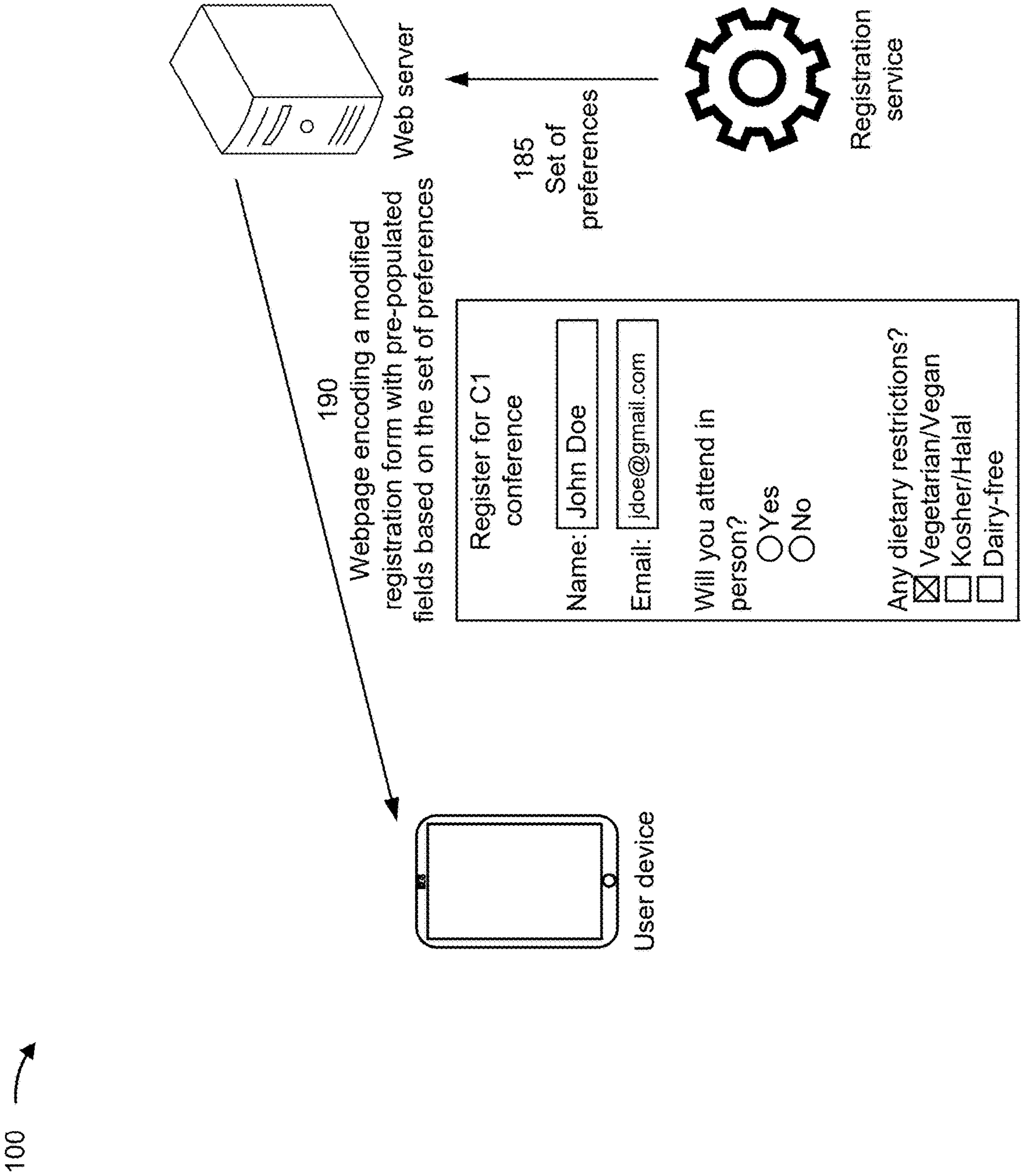

As shown in FIG. 1G and by reference number 185, the registration service may transmit, and the web server may receive, the set of preferences associated with the user. In some implementations, the web server may transmit, and the registration service may receive, a request for the set of preferences based on the indication of the user in the URL (e.g., the request including the indication); therefore, the registration service may transmit, and the web server may receive, the set of preferences in response to the request from the web server.

Although FIG. 1F shows the registration service retrieving stored preferences, other examples may additionally or alternatively include the registration service retrieving predicted preferences. For example, the registration service may transmit, and an ML host associated with an ML model may receive, a request including an identifier of the user. The ML host for predicting preferences may be the same ML host described in connection with FIG. 1A or a different ML host. Similarly, the ML model for predicting preferences may be the same ML model described in connection with FIG. 1A or a different ML model.

The ML model may be trained (e.g., by the ML host and/or a device at least partially separate from the ML host) using a labeled set of users and preferences (e.g., for supervised learning). Additionally, or alternatively, the ML model may be trained using an unlabeled set of users and preferences (e.g., for deep learning). The ML model may be configured to determine whether a preference should be added for a user or not (e.g., based on information associated with the user). Additionally, or alternatively, the ML model may be configured to score each preference in a set of possible preferences (e.g., based on information associated with the user). For example, the ML model may determine a probability that the preference is relevant to the user (e.g., based on information associated with the user). Accordingly, the preference may be added (or not) to a set of preferences associated with the user based on whether the score satisfies an inclusion threshold.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., information about front-end devices). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the registration service, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

The web server may pre-populate a field (e.g., at least one field) in the subset of fields in the registration form, based on the set of preferences. In FIG. 1G, the “Name” field is pre-populated with “John Doe,” the “Email” field is pre-populated with “jdoe@gmail.com,” and the dietary restrictions field is pre-populated with “Vegetarian/Vegan.” On the other hand, the in person attendance field is not pre-populated (e.g., because the data source described above did not include a stored in person attendance preference for the user and/or the ML model described above could not predict in person attendance preference for the user).

Accordingly, the web server may generate a modified registration form. For example, the web server may adjust the webpage to encode the modified registration form.

As shown by reference number 190, the web server may transmit, and the user device may receive, the webpage encoding the modified registration form. For example, the web server may transmit, and the user device may receive, the webpage in response to the request from the user device (e.g., described in connection with reference number 165). A web browser (or another similar type of application) executed by the user device may output the webpage, with the modified registration form, to the user.

Although the example 100 is described in connection with the web server generating the webpage and modifying the webpage based on the pre-population, other examples may include the web server generating the webpage in a single operation. For example, the web server may receive the subset of fields and the set of preferences before generating the webpage. Accordingly, the web server may generate and pre-populate the registration form in a single operation.

Figure 1H:
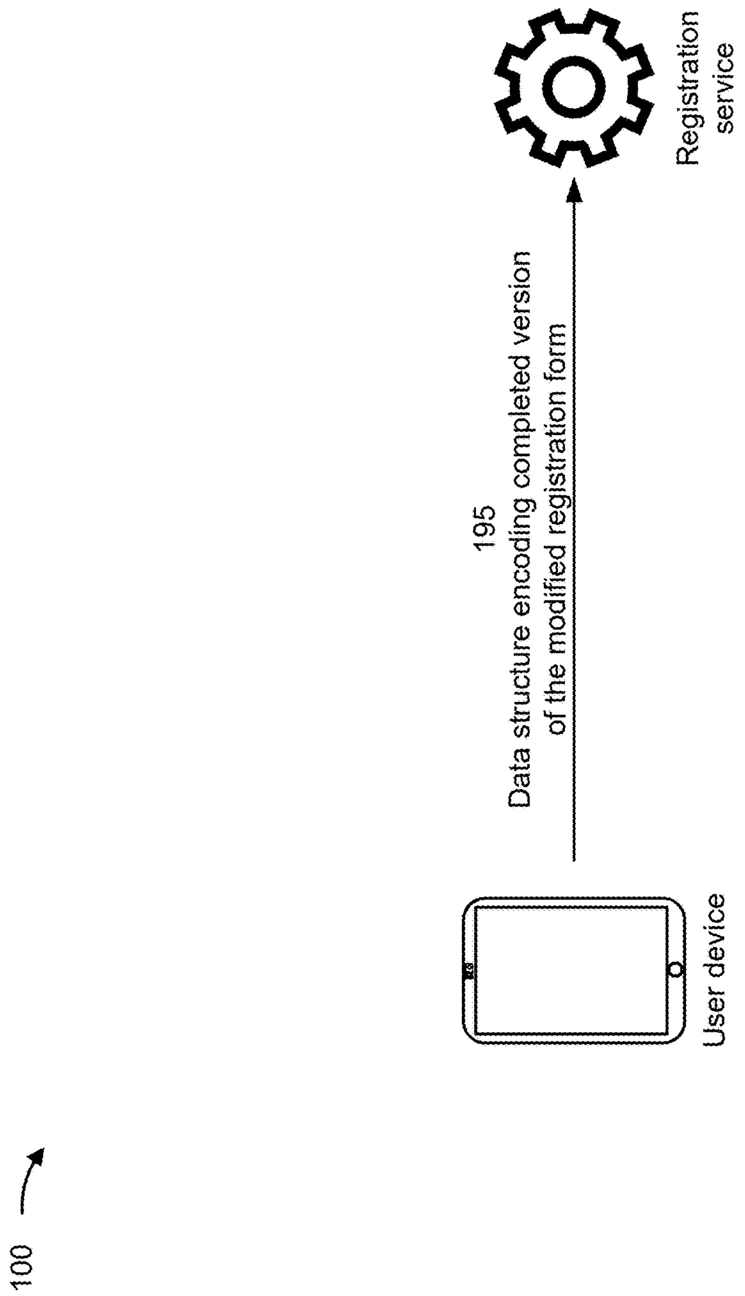

As shown in FIG. 1H and by reference number 195, the user device may transmit, and the registration service may receive, a data structure encoding a completed version of the modified registration form. In some implementations, the user of the user device may provide input that triggers the user device to transmit the data structure. For example, the user may interact with the modified registration form (e.g., using an input component of the user device) in order to provide input for fields that were not pre-populated and/or for modifying fields that were pre-populated. Therefore, the completed version may include fields completed by the user and/or pre-populated fields modified by the user. Additionally, the user device may package the completed version in the data structure for transmission to the registration service. In order to further improve security, the user device may encrypt the data structure. For example, the user device may use a password, a private key (e.g., received from a key distribution center (KDC)), or another type of shared secret to encrypt the data structure.

Although the example 100 shows the registration service as receiving the data structure from the user device, other examples may include the web server receiving the data structure from the user device. For example, the web server may be at least partially integrated (e.g., logically, virtually, and/or physically) with the registration service. Additionally, or alternatively, the web server may receive the data structure for forwarding (e.g., directly or in a new message) to the registration service. In some implementations, the web server may transmit, and the registration service may receive, the data structure as encrypted. Alternatively, the web server may decrypt the data structure before transmitting the data structure to the registration service.

In some implementations, the registration service (and/or the web server) may transmit, and the user device may receive, an indication that the user is registered for the event. For example, the registration service (and/or the web server) may transmit, and the user device may receive, instructions for a UI indicating that the user is registered for the event. Additionally, or alternatively, the indication may be included in a text message, an email message, and/or a push notification, among other examples. In some implementations, the registration service may transmit the indication to the web server for forwarding (e.g., directly or in a new message) to the user device.

By using techniques as described in connection with FIGS. 1A-1H, the registration service may generate and use of the base URL to indicate the subset of fields, out of the larger set of fields, to use in the registration form. Therefore, the web server may quickly generate the registration form based on the URL. As a result, creating the registration form consumes less power and fewer processing resources at the administrator device, and loading the registration form consumes less power and fewer processing resources at the web server. Additionally, preferences associated with internal users and preferences associated with external users may be stored separately. As a result, security is increased.

As indicated above, FIGS. 1A-1H are provided as an example. Other examples may differ from what is described with regard to FIGS. 1A-1H.

FIGS. 2A-2D are diagrams of an example 200 associated with event preferences. As shown in FIGS. 1A-1H, example 100 includes a user, a registration service, and an external storage. These devices are described in more detail in connection with FIGS. 3 and 4.

Figure 2A:
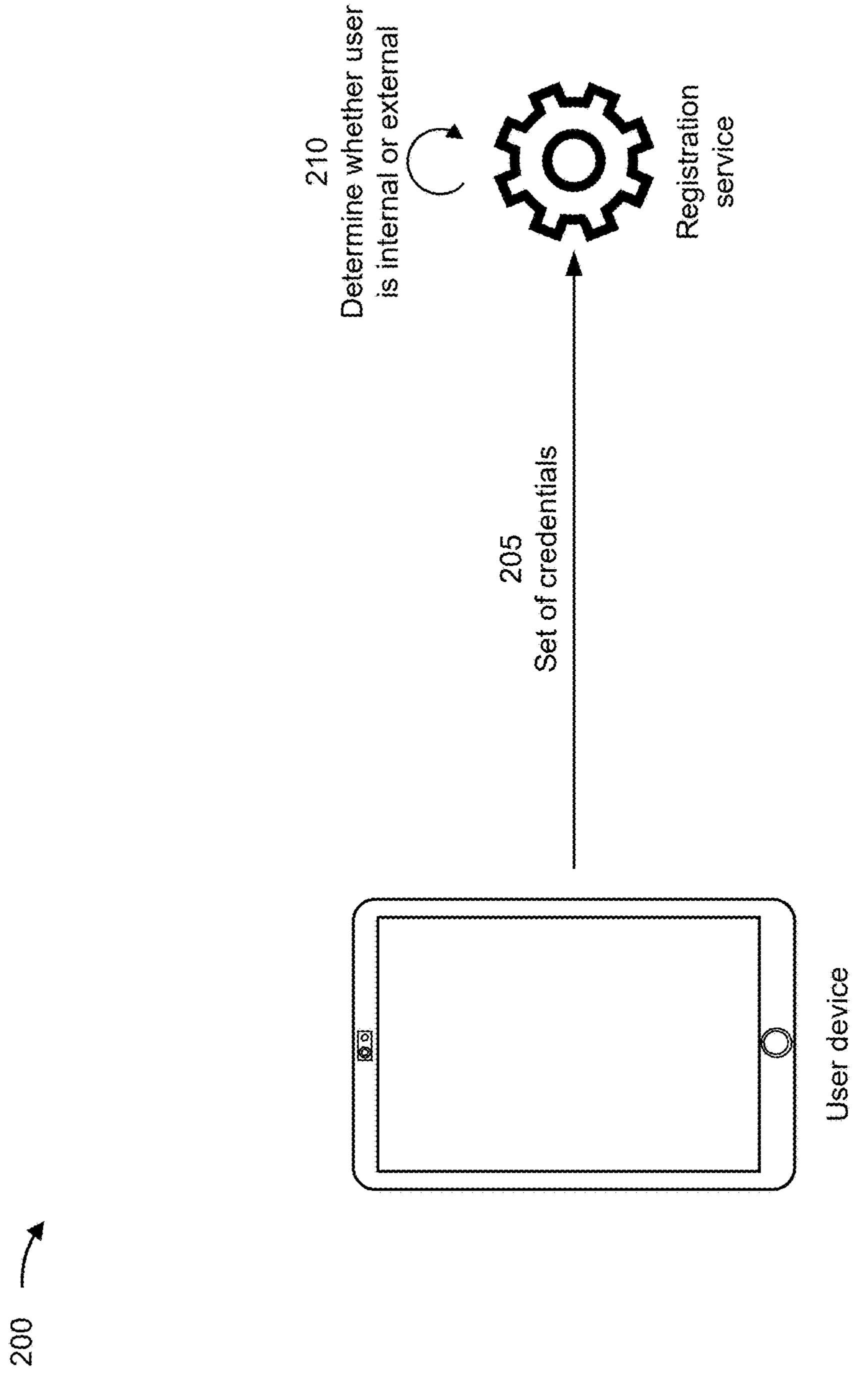
FIGS. 2A-2D are diagrams of an example implementation relating to event preferences, in accordance with some embodiments of the present disclosure.

As shown in FIG. 2A and by reference number 205, the user device may transmit, and the registration service may receive, a set of credentials associated with a user (of the user device). The set of credentials may include a username and password, a passcode, a secret answer, a certificate, a private key, and/or biometric information, among other examples. The set of credentials may allow the user device to access a set of preferences associated with the user. In some implementations, the set of credentials may be included in a request to view (and/or edit) the set of preferences. Although described as included in the request, the set of credentials may be transmitted separately. For example, the registration service may transmit, and the user device may receive, a request for credentials in response to the request to view (and/or edit) the set of preferences. Accordingly, the user device may transmit the set of credentials in response to the request from the registration service. Alternatively, the user device may transmit, and the registration service may receive, the set of credentials, such that the registration service may verify the set of credentials and accept the request to view (and/or edit) the set of preferences from the user device based on verifying the set of credentials.

Although the example 200 is described in connection with a login from the user device, other examples may include a web server requesting the set of preferences associated with the user (e.g., as described in connection with FIG. 1G). In some implementations, the web server may include a token and/or another set of credentials that allow the web server to access the set of preferences associated with the user. A request from the web server may be associated with an alphanumeric indicator of the user that was indicated in a URL (e.g., as described in connection with FIG. 1E).

As shown by reference number 210, the registration service may determine whether the user is an internal user or an external user. For example, the registration service may compare an identifier associated with the user (e.g., a name, a username, and/or an email address, among other examples) to a list of internal users. Accordingly, the registration service may determine that the user is internal based on the identifier associated with the user being included in the list and may determine that the user is external based on the identifier associated with the user being omitted from the list. In another example, the registration service may use a data structure that associates characteristics in user identifiers (e.g., domain names in email addresses) with indications of whether users are internal or external. Accordingly, the registration service may determine that the user is internal based on a domain name in an email address associated with the user being associated with an indication of internality (in the data structure) and may determine that the user is external based on a domain name in an email address associated with the user being associated with an indication of externality or being absent from the data structure. In another example, the registration service may apply a condition to determine whether the user is internal or external. For example, the condition may indicate that particular domain names and/or particular patterns, among other examples, in user identifiers indicate internality or externality. Accordingly, the registration service may determine that the user is internal based on the condition being satisfied and may determine that the user is external based on the condition being unsatisfied.

Figure 2B:
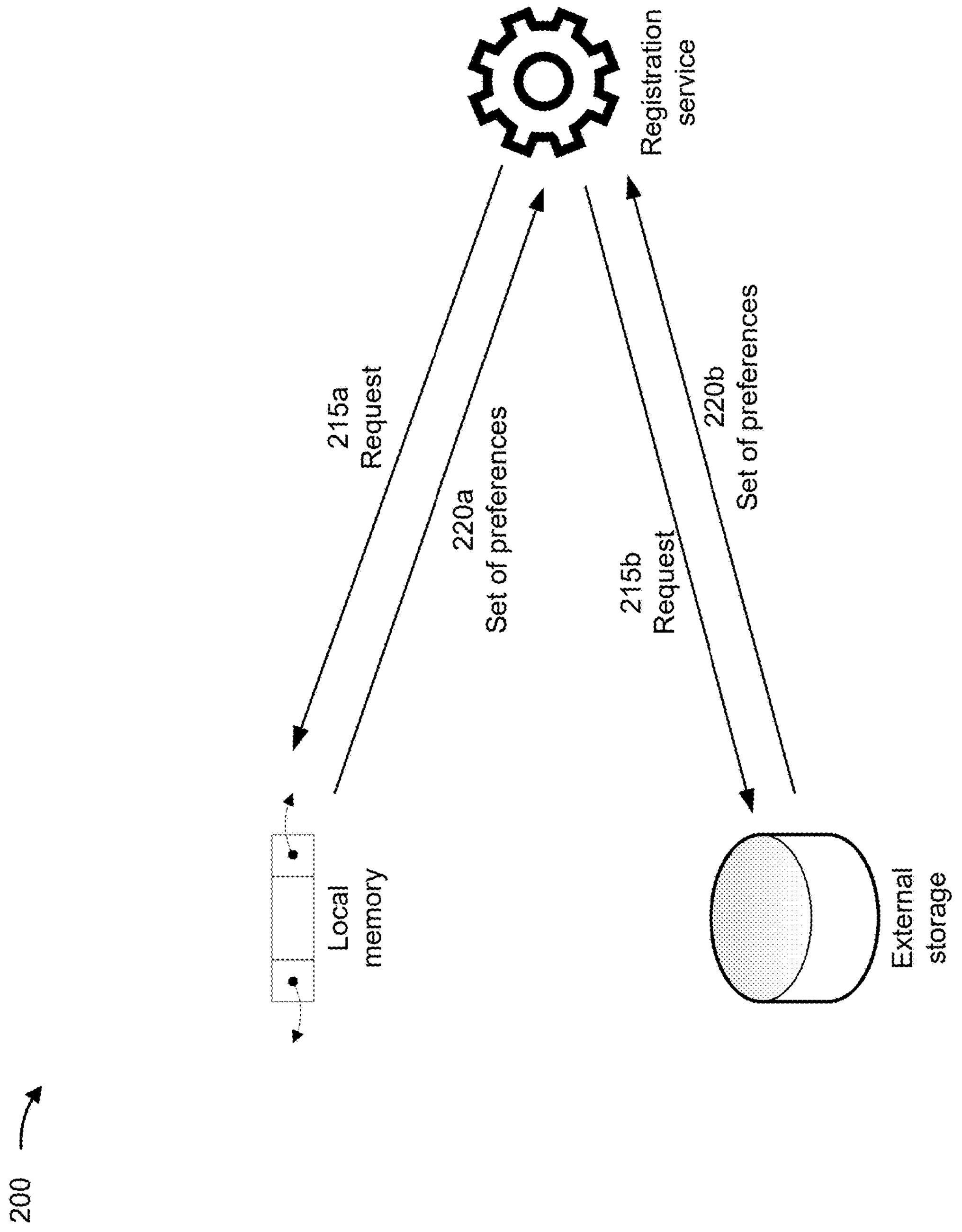

As shown in FIG. 2B and by reference number 215*a*, the registration service may transmit, and a local memory (e.g., one or more memories controlled by the registration service) may receive, a request for the set of preferences. For example, the request may be a command (e.g., translated by a driver for the local memory and transmitted via a bus, as described in connection with FIG. 4). As shown by reference number 220*a*, the local memory may transmit, and the registration service may receive, the set of preferences in response to the request. The registration service may therefore retrieve the set of preferences from the local memory based on the user being an internal user.

Alternatively, as shown by reference number 215*b*, the registration service may transmit, and the external storage may receive, a request for the set of preferences. For example, the request may be an HTTP request, an FTP request, and/or an API call. In some implementations, the external storage may include an external database, and the request may include a query.

In some implementations, the registration service may transmit, and the external storage may receive, a set of credentials associated with the registration service. The set of credentials may include a username and password, a passcode, a secret answer, a certificate, a private key, and/or biometric information, among other examples. The set of credentials may allow the registration service to access the set of preferences. In some implementations, the set of credentials may be included in the request for the set of preferences (e.g., the query). Although described as included in the request, the set of credentials may be transmitted separately. For example, the external storage may transmit, and the registration service may receive, a request for credentials in response to the request for the set of preferences (e.g., the query). Accordingly, the registration service may transmit the set of credentials in response to the request from the external storage. Alternatively, the registration service may transmit, and the external storage may receive, the set of credentials, such that the external storage may verify the set of credentials and accept the request for the set of preferences (e.g., the query) from the registration service based on verifying the set of credentials.

As shown by reference number 220*b*, the external storage may transmit, and the registration service may receive, the set of preferences in response to the request. The registration service may therefore retrieve the set of preferences from the external storage based on the user being an external user.

Figure 2C:
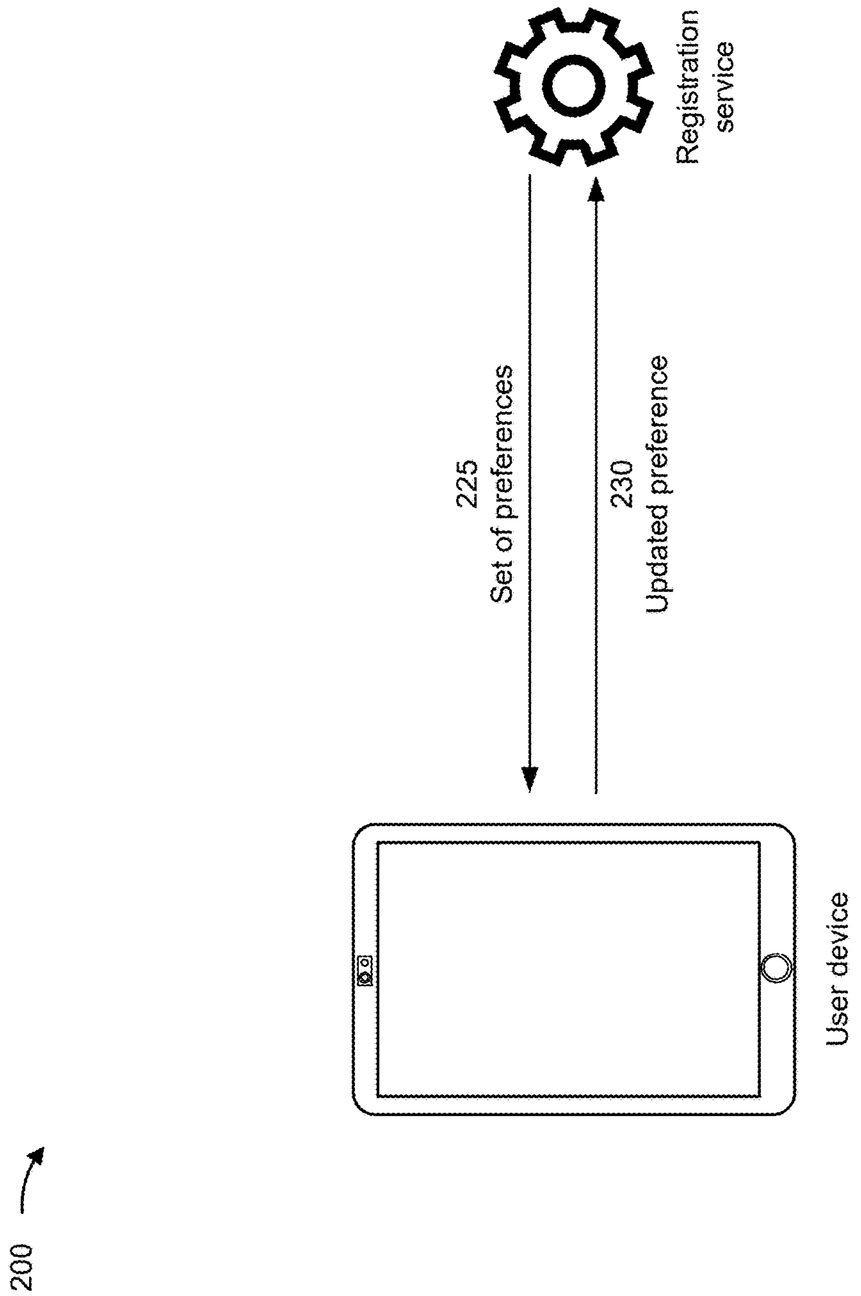

As shown in FIG. 2C and by reference number 225, the registration service may output the set of preferences to the user device. For example, the registration service may transmit, and the user device may receive, instructions for a UI indicating the set of preferences. Additionally, or alternatively, the set of preferences may be indicated in a text message, an email message, and/or a push notification, among other examples.

Although the example 200 is described in connection with the registration service outputting the set of preferences to the user device, other examples may include the registration service outputting the set of preferences to a web server. For example, the web server may request the set of preferences associated with the user (e.g., as described in connection with FIG. 1G). Therefore, the registration service may transmit, and the web server may receive, the set of preferences in response to a request from the web server.

As shown by reference number 230, the user device may transmit, and the registration service may receive, a request to update a preference (e.g., at least one preference) in the set of preferences. In some implementations, the user using the user device may provide input that triggers the user device to transmit the request to update the preference. For example, the user may interact with the UI indicating the set of preferences in order to provide the input to trigger the user device to transmit the request to the registration service.

Figure 2D:
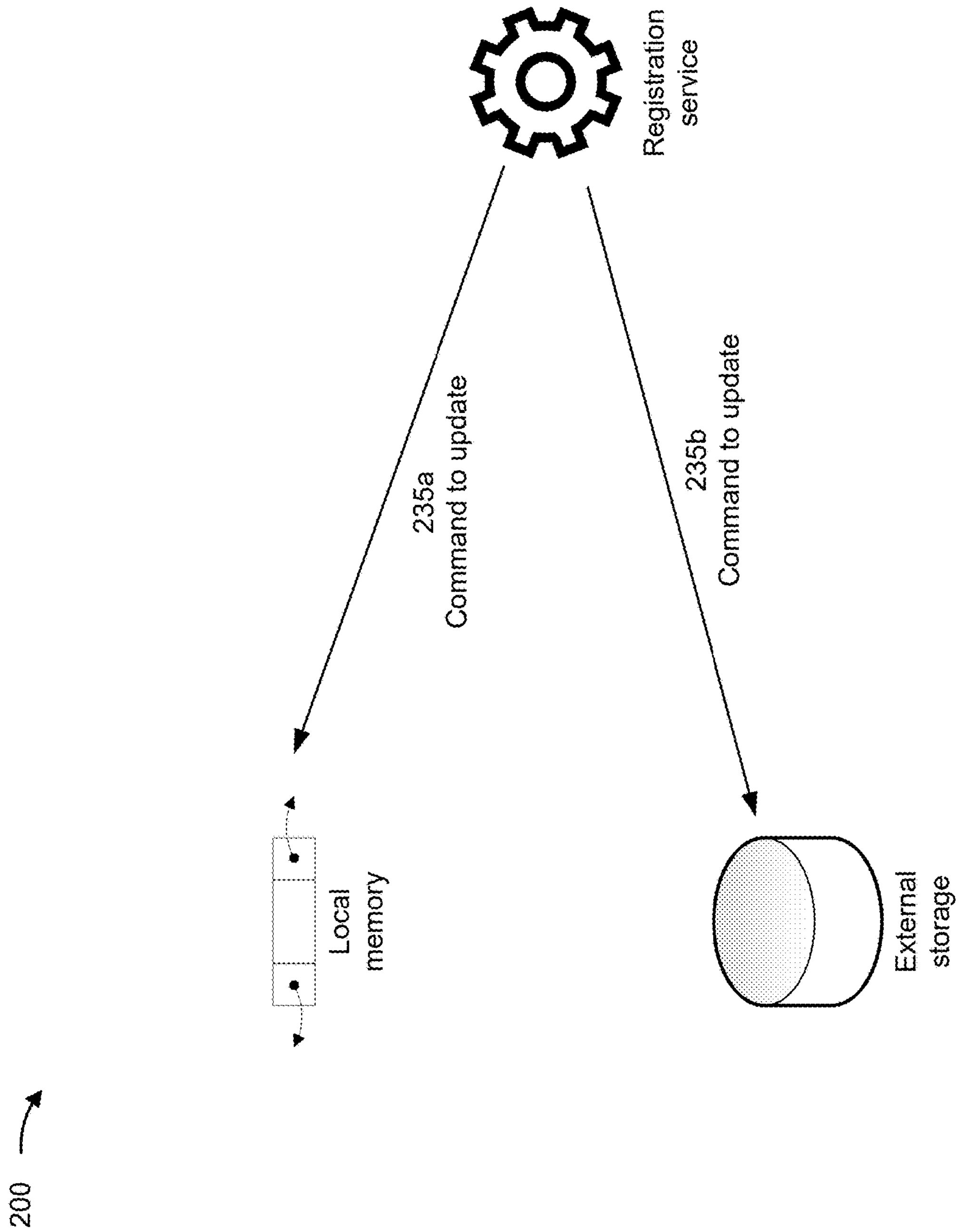

As shown in FIG. 2D and by reference number 235*a*, the registration service may transmit, and the local memory may receive, a command to update the set of preferences. For example, the command may be based on the request to update the preference (from the user device). The registration service may therefore update the set of preferences in the local memory based on the user being an internal user.

Alternatively, as shown by reference number 235*b*, the registration service may transmit, and the external storage may receive, a command to update the set of preferences. As described above, the command may be based on the request to update the preference (from the user device). The registration service may therefore update the set of preferences in the external storage based on the user being an external user.

By using techniques as described in connection with FIGS. 2A-2D, the registration service maintains preferences for internal users separately from preferences for external users. As a result, security is improved. For example, preferences associated with internal users may be used to train internal ML models while preferences associated with external users are not used for training. In another example, preferences associated with external users may be provided to third-party services as authorized by the external users while preferences associated with internal users are retained as confidential.

As indicated above, FIGS. 2A-2D are provided as an example. Other examples may differ from what is described with regard to FIGS. 2A-2D.

Figure 3:
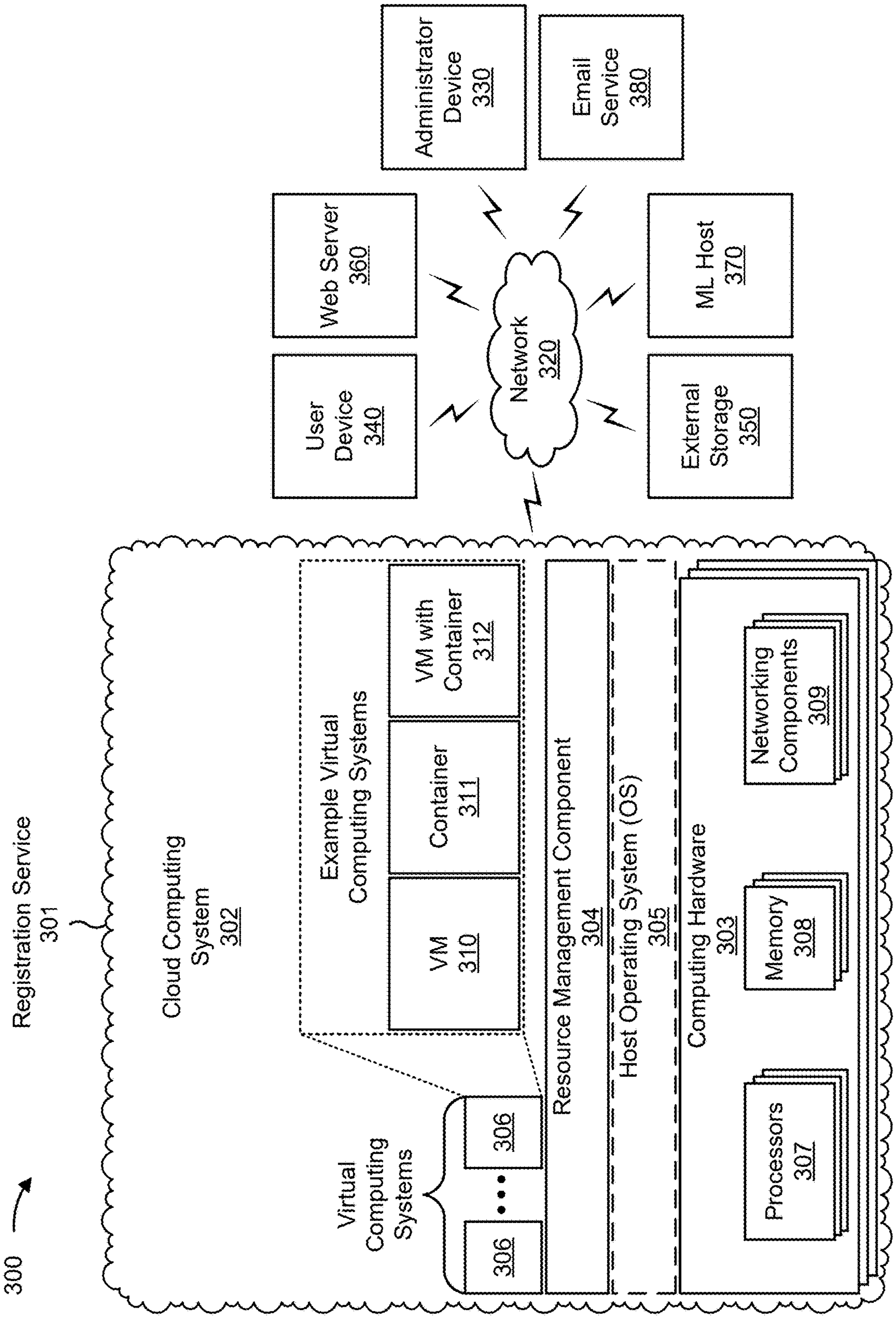
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a registration service 301, which may include one or more elements of and/or may execute within a cloud computing system 302. The cloud computing system 302 may include one or more elements 303-312, as described in more detail below. As further shown in FIG. 3, environment 300 may include a network 320, an administrator device 330, a user device 340, an external storage 350, a web server 360, an ML host 370, and/or an email service 380. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the registration service 301 may include one or more elements 303-312 of the cloud computing system 302, may execute within the cloud computing system 302, and/or may be hosted within the cloud computing system 302, in some implementations, the registration service 301 may not be cloud-based (e.g., may be implemented outside of a cloud computing system) or may be partially cloud-based. For example, the registration service 301 may include one or more devices that are not part of the cloud computing system 302, such as device 400 of FIG. 4, which may include a standalone server or another type of computing device. The registration service 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The administrator device 330 may include one or more devices capable of receiving, generating, storing, processing, and/or providing information associated with registration forms, as described elsewhere herein. The administrator device 330 may include a communication device and/or a computing device. For example, the administrator device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 330 may communicate with one or more other devices of environment 300, as described elsewhere herein.

The user device 340 may include one or more devices capable of receiving, generating, storing, processing, and/or providing information associated with webpages, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 340 may communicate with one or more other devices of environment 300, as described elsewhere herein.

The external storage 350 may include one or more devices capable of receiving, generating, storing, processing, and/or providing information associated with preferences, as described elsewhere herein. The external storage 350 may include a communication device and/or a computing device. For example, the external storage 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The external storage 350 may communicate with one or more other devices of environment 300, as described elsewhere herein.

The web server 360 may include one or more devices capable of receiving, generating, storing, processing, and/or providing information associated with webpages, as described elsewhere herein. The web server 360 may include a communication device and/or a computing device. For example, the web server 360 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The web server 360 may communicate with one or more other devices of environment 300, as described elsewhere.

The ML host 370 may include one or more devices capable of receiving, generating, storing, processing, and/or providing information associated with machine learning models, as described elsewhere herein. The ML host 370 may include a communication device and/or a computing device. For example, the ML host 370 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 370 may communicate with one or more other devices of environment 300, as described elsewhere herein.

The email service 380 may include one or more devices capable of receiving, generating, storing, processing, and/or providing information associated with email messages, as described elsewhere herein. The email service 380 may include a communication device and/or a computing device. For example, the email service 380 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The email service 380 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
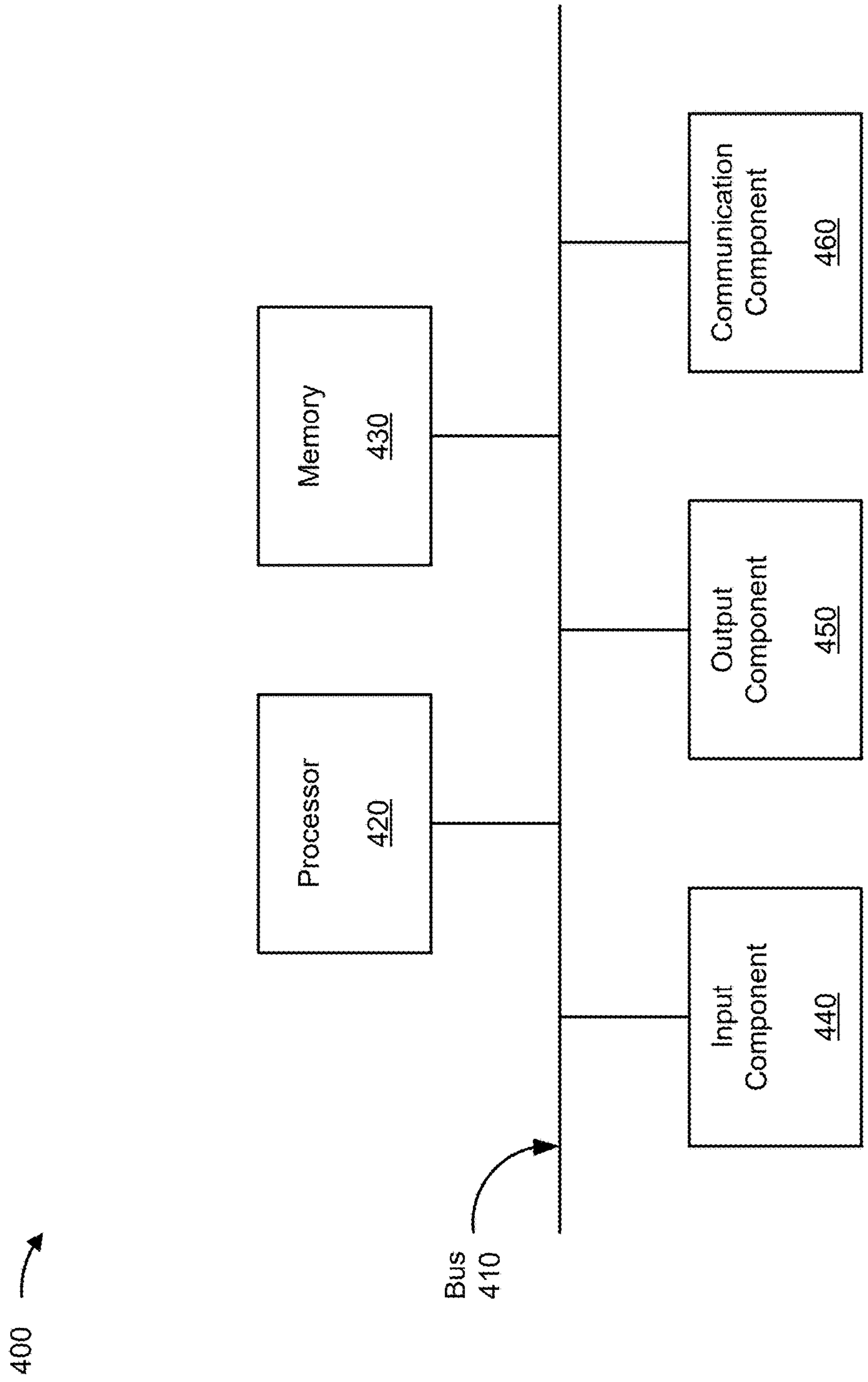
FIG. 4 is a diagram of example components of one or more devices of FIG. 3, in accordance with some embodiments of the present disclosure.

FIG. 4 is a diagram of example components of a device 400 associated with event registration and preferences. The device 400 may correspond to an administrator device 330, a user device 340, an external storage 350, a web server 360, an ML host 370, and/or an email service 380. In some implementations, an administrator device 330, a user device 340, an external storage 350, a web server 360, an ML host 370, and/or an email service 380 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
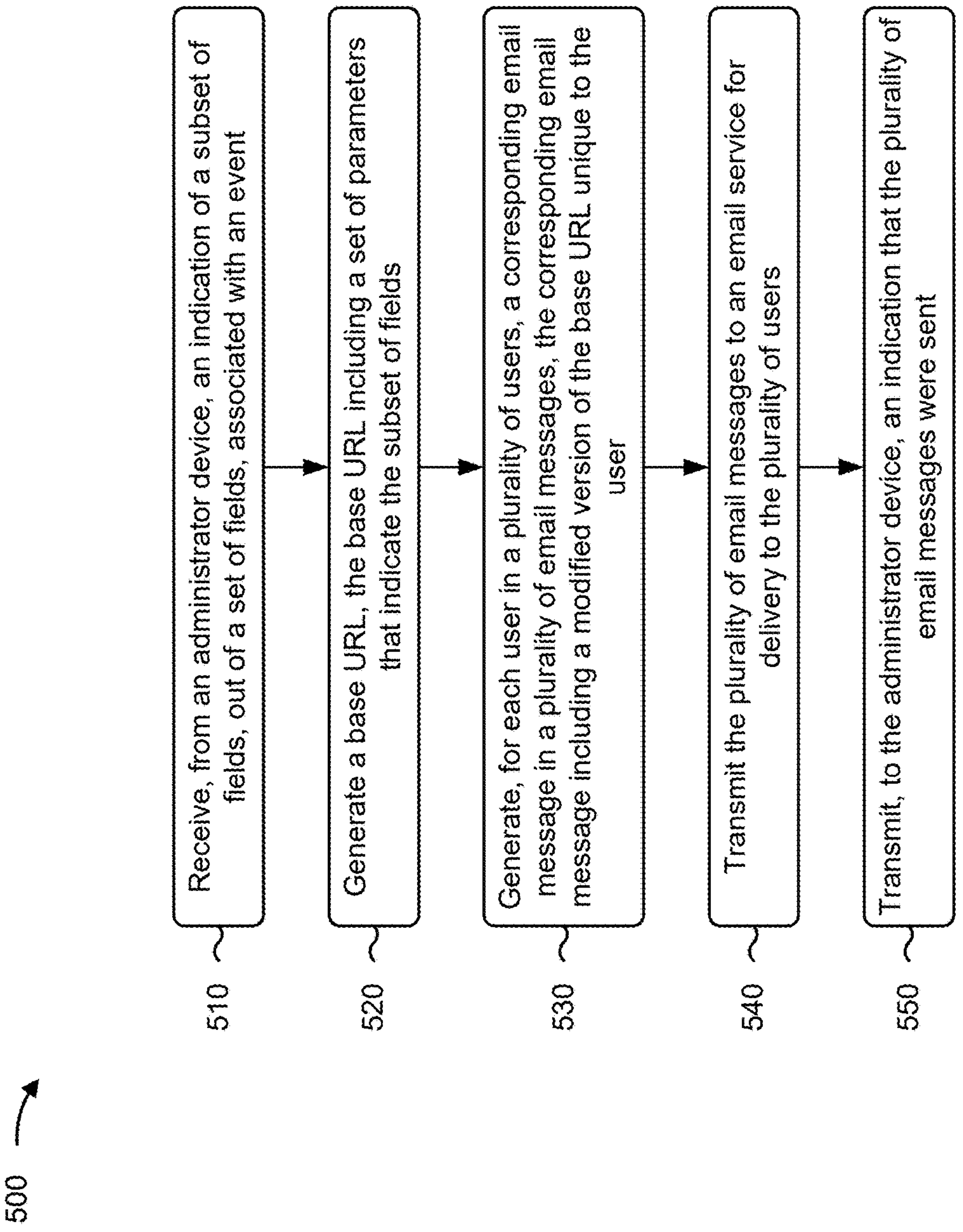
FIGS. 5-6 are flowcharts of example processes relating to event registration, in accordance with some embodiments of the present disclosure.

FIG. 5 is a flowchart of an example process 500 associated with event registration. In some implementations, one or more process blocks of FIG. 5 may be performed by a registration service 301. In some implementations, one or more process blocks of FIG. 5 may be performed by another device or a group of devices separate from or including the registration service 301, such as an administrator device 330, a user device 340, an external storage 350, a web server 360, an ML host 370, and/or an email service 380. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from an administrator device, an indication of a subset of fields, out of a set of fields, associated with an event (block 510). For example, the registration service 301 (e.g., using processor 420, memory 430, input component 440, and/or communication component 460) may receive, from an administrator device, an indication of a subset of fields, out of a set of fields, associated with an event, as described above in connection with reference number 125 of FIG. 1B. As an example, the registration service 301 may transmit an indication of one or more suggested fields to the administrator device, and the registration service 301 may receive the indication of the subset of fields, from the administrator device, in response to the indication of the one or more suggested fields.

As further shown in FIG. 5, process 500 may include generating a base URL, the base URL including a set of parameters that indicate fields in the subset (block 520). For example, the registration service 301 (e.g., using processor 420 and/or memory 430) may generate a base URL, the base URL including a set of parameters that indicate fields in the subset, as described above in connection with reference number 130 of FIG. 1C. As an example, the registration service 301 may generate the base URL by generating a domain and a page indicator. In some implementations, the registration service 301 may select the domain based on information associated with the event. The registration service 301 may generate the page indicator as a unique identifier (or at least quasi-unique identifier to the registration service 301) for the event. Additionally, the registration service 301 may generate the base URL by appending a slug to the domain and page indicator, where the slug includes the set of parameters.

As further shown in FIG. 5, process 500 may include generating, for each user in a plurality of users, a corresponding email message in a plurality of email messages, the corresponding email message including a modified version of the base URL that is unique to the user (block 530). For example, the registration service 301 (e.g., using processor 420 and/or memory 430) may generate, for each user in a plurality of users, a corresponding email message in a plurality of email messages, the corresponding email message including a modified version of the base URL that is unique to the user, as described above in connection with reference number 145 of FIG. 1D. As an example, the registration service 301 may generate the modified version of the base URL by appending an anonymized identifier of the user. The registration service 301 may insert, into a template email message and for each corresponding email message, the modified version of the base URL that is unique to the user.

As further shown in FIG. 5, process 500 may include transmitting the plurality of email messages to an email service for delivery to the plurality of users (block 540). For example, the registration service 301 (e.g., using processor 420, memory 430, and/or communication component 460) may transmit the plurality of email messages to an email service for delivery to the plurality of users, as described above in connection with reference number 150 of FIG. 1D. As an example, the email service may manage a plurality of email addresses (and/or a plurality of accounts) associated with the plurality of users.

As further shown in FIG. 5, process 500 may include transmitting, to the administrator device, an indication that the plurality of email messages have been sent (block 550). For example, the registration service 301 (e.g., using processor 420, memory 430, and/or communication component 460) may transmit, to the administrator device, an indication that the plurality of email messages have been sent, as described above in connection with reference number 155 of FIG. 1D. As an example, the registration service 301 may transmit, to the administrator device, instructions for a UI indicating that the plurality of email messages have been sent. Additionally, or alternatively, the indication may be included in a text message, an email message, and/or a push notification, among other examples.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1H and/or FIGS. 2A-2D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
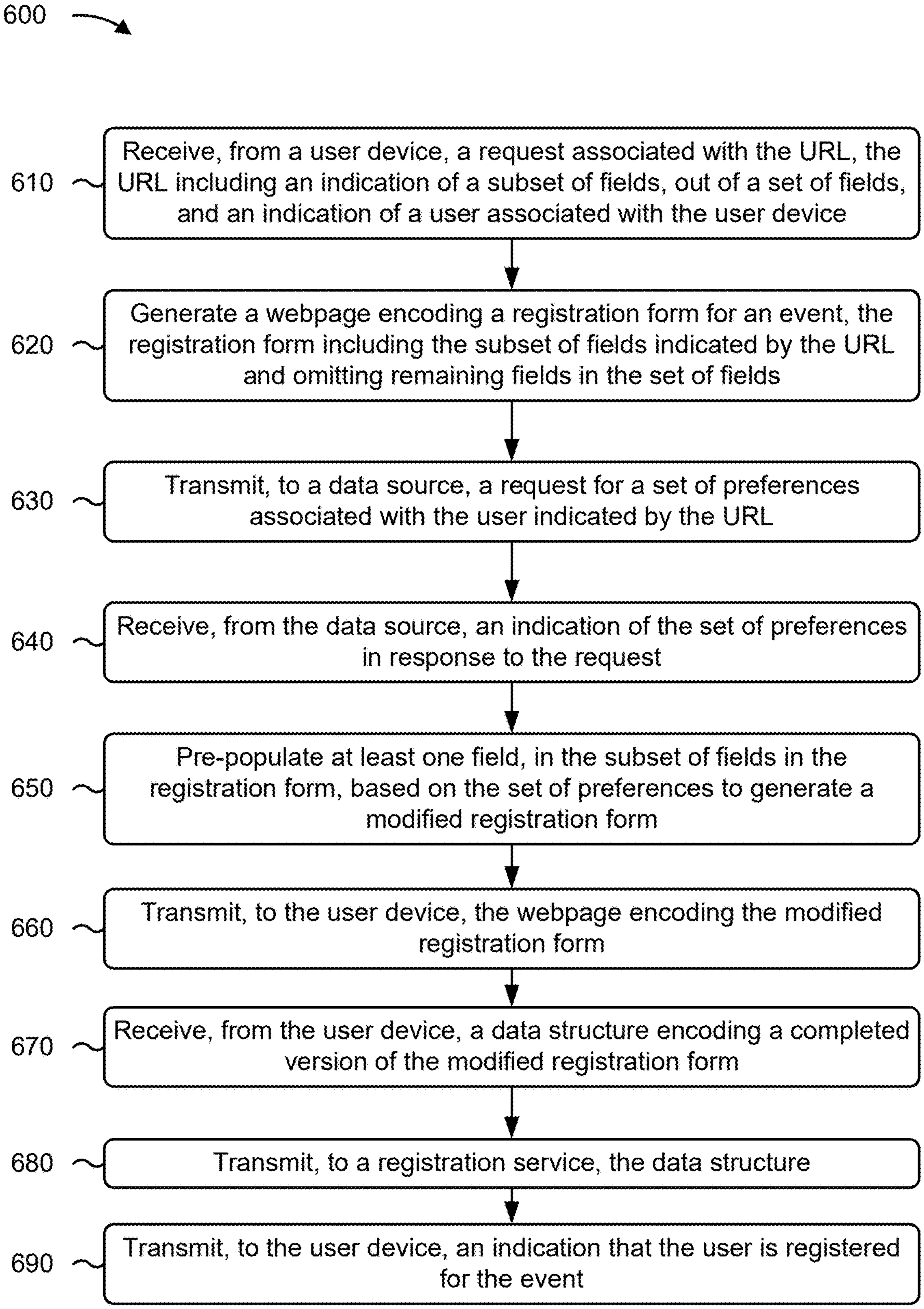

FIG. 6 is a flowchart of an example process 600 associated with event registration. In some implementations, one or more process blocks of FIG. 6 may be performed by a web server 360. In some implementations, one or more process blocks of FIG. 6 may be performed by another device or a group of devices separate from or including the web server 360, such as a registration service 301, an administrator device 330, a user device 340, an external storage 350, an ML host 370, and/or an email service 380. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include receiving, from a user device, a request associated with the URL, the URL including an indication of a subset of fields, of a set of fields, and an indication of a user associated with the user device (block 610). For example, the web server 360 (e.g., using processor 420, memory 430, and/or communication component 460) may receive, from a user device, a request associated with the URL, the URL including an indication of a subset of fields, of a set of fields, and an indication of a user associated with the user device, as described above in connection with reference number 165 of FIG. 1E. As an example, the web server 360 may be associated with the URL, such that the web server 360 may receive the request based on resolution of the URL (e.g., using a DNS or another type of service) to an IP address associated with the web server 360.

As further shown in FIG. 6, process 600 may include generating a webpage encoding a registration form for an event, the registration form including the subset of fields indicated by the URL and omitting remaining fields in the set of fields (block 620). For example, the web server 360 (e.g., using processor 420, memory 430, and/or communication component 460) may generate a webpage encoding a registration form for an event, the registration form including the subset of fields indicated by the URL and omitting remaining fields in the set of fields, as described above in connection with reference number 170 of FIG. 1E. As an example, the web server 360 may receive, from a registration service, the subset of fields based on the indication in the URL. Alternatively, the web server 360 may determine the subset of fields directly from the indication in the URL without contacting the registration service.

As further shown in FIG. 6, process 600 may include transmitting, to a data source, a request for a set of preferences associated with the user indicated by the URL (block 630). For example, the web server 360 (e.g., using processor 420, memory 430, and/or communication component 460) may transmit, to a data source, a request for a set of preferences associated with the user indicated by the URL, as described above in connection with FIG. 1G. As an example, the web server 360 may transmit the request for the set of preferences based on the indication of the user in the URL (e.g., the request including the indication).

As further shown in FIG. 6, process 600 may include receiving, from the data source, an indication of the set of preferences in response to the request (block 640). For example, the web server 360 (e.g., using processor 420, memory 430, and/or communication component 460) may receive, from the data source, an indication of the set of preferences in response to the request, as described above in connection with reference number 185 of FIG. 1G. As an example, the web server 360 may select the data source based on whether the user is internal or external, and the web server 360 may receive the indication in response to the request for the set of preferences.

As further shown in FIG. 6, process 600 may include pre-populating at least one field, in the subset of fields in the registration form, based on the set of preferences to generate a modified registration form (block 650). For example, the web server 360 (e.g., using processor 420 and/or memory 430) may pre-populating at least one field, in the subset of fields in the registration form, based on the set of preferences to generate a modified registration form, as described above in connection with FIG. 1G. As an example, the web server 360 may adjust the webpage to encode the modified registration form.

As further shown in FIG. 6, process 600 may include transmitting, to the user device, the webpage encoding the modified registration form (block 660). For example, the web server 360 (e.g., using processor 420, memory 430, and/or communication component 460) may transmit, to the user device, the webpage encoding the modified registration form, as described above in connection with reference number 190 of FIG. 1G. As an example, the web server 360 may transmit the webpage to the user device in response to the request from the user device.

As further shown in FIG. 6, process 600 may include receiving, from the user device, a data structure encoding a completed version of the modified registration form (block 670). For example, the web server 360 (e.g., using processor 420, memory 430, and/or communication component 460) may receive, from the user device, a data structure encoding a completed version of the modified registration form, as described above in connection with reference number 195 of FIG. 1H. As an example, the completed version may include fields completed by a user of the user device and/or pre-populated fields modified by the user. In order to further improve security, the data structure may be encrypted.

As further shown in FIG. 6, process 600 may include transmitting, to a registration service, the data structure (block 680). For example, the web server 360 (e.g., using processor 420, memory 430, and/or communication component 460) may transmit, to a registration service, the data structure, as described above in connection with FIG. 1H. As an example, the web server 360 may transmit the data structure as encrypted to the registration service. Alternatively, the web server 360 may decrypt the data structure before transmitting the data structure to the registration service. The web server 360 may transmit the data structure in order to register the user for the event.

As further shown in FIG. 6, process 600 may include transmitting, to the user device, an indication that the user is registered for the event (block 690). For example, the web server 360 (e.g., using processor 420, memory 430, and/or communication component 460) may transmit, to the user device, an indication that the user is registered for the event, as described above in connection with FIG. 1H. As an example, the web server 360 may transmit instructions for a UI indicating that the user is registered for the event. Additionally, or alternatively, the indication may be included in a text message, an email message, and/or a push notification, among other examples. The web server 360 may transmit the indication in response to a confirmation from the registration service (which, in turn, may be received in response to the data structure).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1H and/or FIGS. 2A-2D. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

Figure 7:
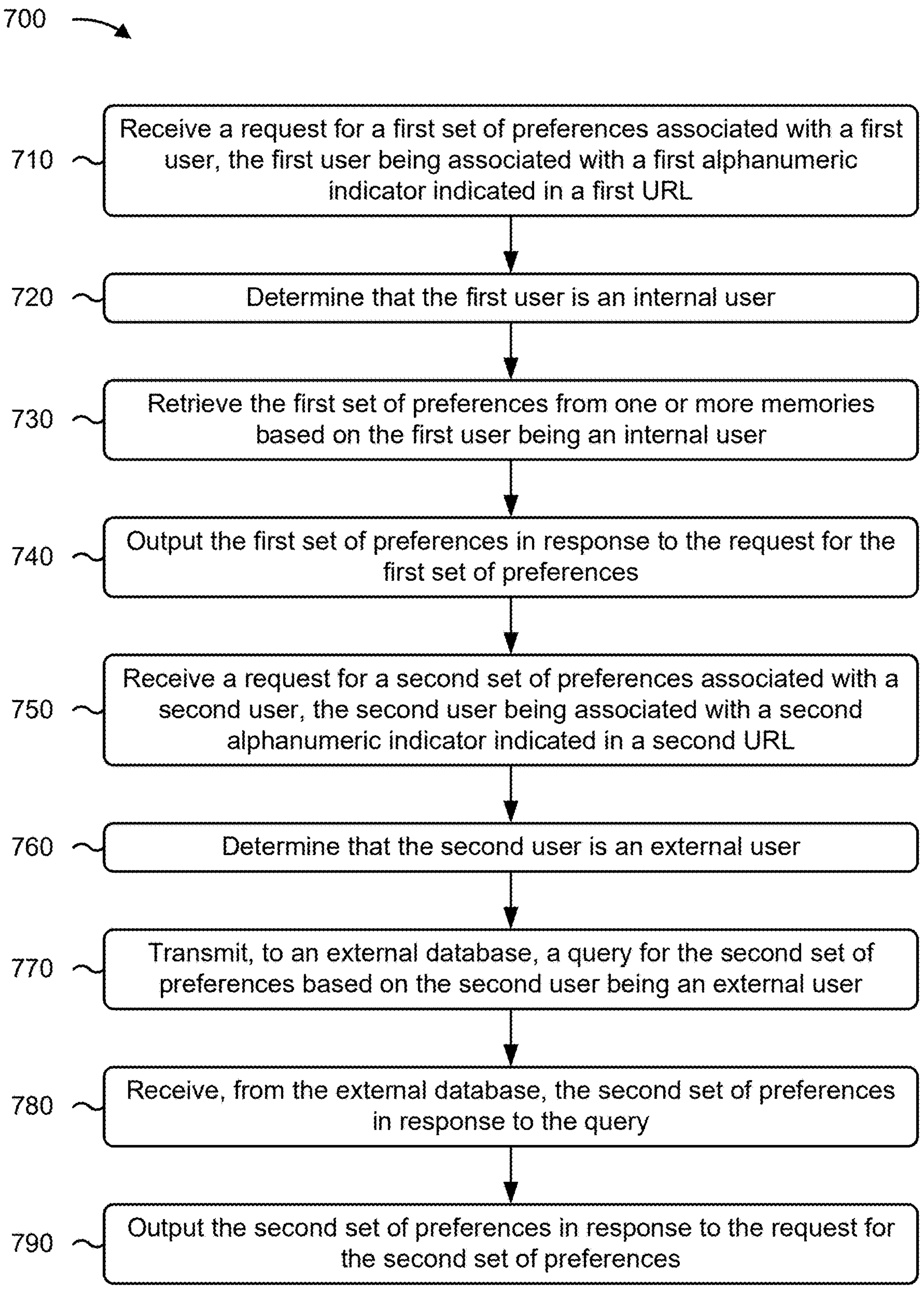
FIG. 7 is a flowchart of an example process relating to event preferences, in accordance with some embodiments of the present disclosure.

FIG. 7 is a flowchart of an example process 700 associated with event preferences. In some implementations, one or more process blocks of FIG. 7 may be performed by a registration service 301. In some implementations, one or more process blocks of FIG. 7 may be performed by another device or a group of devices separate from or including the registration service 301, such as an administrator device 330, a user device 340, an external storage 350, a web server 360, an ML host 370, and/or an email service 380. Additionally, or alternatively, one or more process blocks of FIG. 7 may be performed by one or more components of the device 400, such as processor 420, memory 430, input component 440, output component 450, and/or communication component 460.

As shown in FIG. 7, process 700 may include receiving a request for a first set of preferences associated with a first user, the first user being associated with a first alphanumeric indicator indicated in a first URL (block 710). For example, the registration service 301 (e.g., using processor 420, memory 430, and/or communication component 460) may receive a request for a first set of preferences associated with a first user, the first user being associated with a first alphanumeric indicator indicated in a first URL, as described above in connection with reference number 205 of FIG. 2A. As an example, the registration service 301 may receive the request with a set of credentials that authorizes access to the first set of preferences.

As further shown in FIG. 7, process 700 may include determining that the first user is an internal user (block 720). For example, the registration service 301 (e.g., using processor 420 and/or memory 430) may determine that the first user is an internal user, as described above in connection with reference number 210 of FIG. 2A. As an example, the registration service 301 may compare an identifier associated with the first user (e.g., a name, a username, and/or an email address, among other examples) to a list of internal users. In another example, the registration service 301 may use a data structure that associates characteristics in user identifiers (e.g., domain names in email addresses) with indications of whether users are internal or external. In another example, the registration service 301 may apply a condition to determine that the first user is internal.

As further shown in FIG. 7, process 700 may include retrieving the first set of preferences from one or more memories based on the first user being an internal user (block 730). For example, the registration service 301 (e.g., using processor 420 and/or memory 430) may retrieve the first set of preferences from one or more memories based on the first user being an internal user, as described above in connection with reference numbers 215*a* and 220*a* of FIG. 2B. As an example, the request may be a command (e.g., translated by a driver for the local memory and transmitted via a bus, as described in connection with FIG. 4).

As further shown in FIG. 7, process 700 may include outputting the first set of preferences in response to the request for the first set of preferences (block 740). For example, the registration service 301 (e.g., using processor 420, memory 430, and/or communication component 460) may output the first set of preferences in response to the request for the first set of preferences, as described above in connection with reference number 225 of FIG. 2C. As an example, the registration service 301 may transmit the first set of preferences to a web server in response to the request.

As further shown in FIG. 7, process 700 may include receiving a request for a second set of preferences associated with a second user, the second user being associated with a second alphanumeric indicator indicated in a second URL (block 750). For example, the registration service 301 (e.g., using processor 420, memory 430, and/or communication component 460) may receive a request for a second set of preferences associated with a second user, the second user being associated with a second alphanumeric indicator indicated in a second URL, as described above in connection with reference number 205 of FIG. 2A. As an example, the registration service 301 may receive the request with a set of credentials that authorizes access to the second set of preferences.

As further shown in FIG. 7, process 700 may include determining that the second user is an external user (block 760). For example, the registration service 301 (e.g., using processor 420 and/or memory 430) may determine that the second user is an external user, as described above in connection with reference number 210 of FIG. 2A. As an example, the registration service 301 may compare an identifier associated with the second user (e.g., a name, a username, and/or an email address, among other examples) to a list of internal users. In another example, the registration service 301 may use a data structure that associates characteristics in user identifiers (e.g., domain names in email addresses) with indications of whether users are internal or external. In another example, the registration service 301 may apply a condition to determine that the second user is external.

As further shown in FIG. 7, process 700 may include transmitting, to an external database, a query for the second set of preferences based on the second user being an external user (block 770). For example, the registration service 301 (e.g., using processor 420, memory 430, and/or communication component 460) may transmit, to an external database, a query for the second set of preferences based on the second user being an external user, as described above in connection with reference number 215*b* of FIG. 2B. As an example, the registration service 301 may transmit the query with a set of credentials that authorizes access to the second set of preferences.

As further shown in FIG. 7, process 700 may include receiving, from the external database, the second set of preferences in response to the query (block 780). For example, the registration service 301 (e.g., using processor 420, memory 430, and/or communication component 460) may receive, from the external database, the second set of preferences in response to the query, as described above in connection with reference number 220*b* of FIG. 2B. As an example, the registration service 301 may retrieve the second set of preferences from the external storage based on the second user being an external user.

As further shown in FIG. 7, process 700 may include outputting the second set of preferences in response to the request for the second set of preferences (block 790). For example, the registration service 301 (e.g., using processor 420, memory 430, and/or communication component 460) may output the second set of preferences in response to the request for the second set of preferences, as described above in connection with reference number 225 of FIG. 2C. As an example, the registration service 301 may transmit the second set of preferences to a web server in response to the request.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1H and/or FIGS. 2A-2D. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of event registration based on a uniform resource locator (URL), comprising:
- receiving, from a user device and at a web server, a request associated with the URL, wherein the URL includes an indication of a subset of fields, of a set of fields, and an indication of a user associated with the user device;
- generating, by the web server, a webpage encoding a registration form for an event, wherein the registration form includes the subset of fields indicated by the URL and omits remaining fields in the set of fields;
- transmitting, from the web server and to a data source, a request for a set of preferences associated with the user indicated by the URL;
- receiving, from the data source and at the web server, an indication of the set of preferences in response to the request;
- pre-populating at least one field, in the subset of fields in the registration form, based on the set of preferences, to generate a modified registration form;
- transmitting, to the user device, the webpage encoding the modified registration form;
- receiving, from the user device, a data structure encoding a completed version of the modified registration form;
- transmitting, from the web server and to a registration service, the data structure; and
- transmitting, to the user device, an indication that the user is registered for the event.

2. The method of claim 1, further comprising:
- determining that the user is an internal user; and
- selecting the data source based on the user being an internal user.

3. The method of claim 1, further comprising:
- determining that the user is an external user; and
- selecting the data source based on the user being an external user.

4. The method of claim 1, wherein the data source is associated with a machine learning model that predicts preferences for users.

5. The method of claim 1, wherein the data structure is encrypted, and the method further comprises:

decrypting the data structure before transmitting the data structure to the registration service.

6. The method of claim 1, wherein the data structure is encrypted, and transmitting the data structure to the registration service comprises transmitting the data structure as encrypted.

7. The method of claim 1, wherein generating the webpage comprises:

generating executable code for the webpage to be rendered at the user device.

8. The method of claim 1, wherein generating the webpage comprises:

generating hypertext markup language code for the webpage to be output by the user device.

9. A system, comprising:

one or more memories; and one or more processors, coupled to the one or more memories, configured to:

receive, from a user device, a request associated with a uniform resource locator (URL), wherein the URL includes an indication of a subset of fields, of a set of fields, and an indication of a user associated with the user device;

generate a webpage encoding a registration form for an event, wherein the registration form includes the subset of fields indicated by the URL and omits remaining fields in the set of fields;

transmit, to a data source, a request for a set of preferences associated with the user indicated by the URL;

receive, from the data source, an indication of the set of preferences in response to the request;

populate at least one field, in the subset of fields in the registration form, based on the set of preferences, to generate a modified registration form;

transmit, to the user device, the webpage encoding the modified registration form;

receive, from the user device, a data structure encoding a completed version of the modified registration form;

transmit, to a registration service, the data structure; and transmit, to the user device, an indication that the user is registered for the event.

10. The device of claim 9, wherein the one or more processors are further configured to:

determine that the user is an internal user; and select the data source based on the user being an internal user.

11. The device of claim 9, wherein the one or more processors are further configured to:

determine that the user is an external user; and select the data source based on the user being an external user.

12. The device of claim 9, wherein the data source is associated with a machine learning model that predicts preferences for users.

13. The device of claim 9, wherein the data structure is encrypted, and wherein the one or more processors are further configured to:

decrypt the data structure before transmitting the data structure to the registration service.

14. The device of claim 9, wherein the data structure is encrypted, and transmitting the data structure to the registration service comprises transmitting the data structure as encrypted.

15. The device of claim 9, wherein the one or more processors, to generate the webpage, are configured to:

generate executable code for the webpage to be rendered at the user device.

16. The device of claim 9, wherein the one or more processors, to generate the webpage, are configured to:

generate hypertext markup language code for the webpage to be output by the user device.

17. A non-transitory computer-readable medium storing a set of instructions, the set of instructions comprising:

one or more instructions that, when executed by one or more processors of a device, cause the device to:

receive, from a user device, a request associated with a uniform resource locator (URL), wherein the URL includes an indication of a subset of fields, of a set of fields, and an indication of a user associated with the user device;

generate a webpage encoding a registration form for an event, wherein the registration form includes the subset of fields indicated by the URL and omits remaining fields in the set of fields;

transmit, to a data source, a request for a set of preferences associated with the user indicated by the URL;

receive, from the data source, an indication of the set of preferences in response to the request;

populate at least one field, in the subset of fields in the registration form, based on the set of preferences, to generate a modified registration form;

transmit, to the user device, the webpage encoding the modified registration form;

receive, from the user device, a data structure encoding a completed version of the modified registration form;

transmit, to a registration service, the data structure; and transmit, to the user device, an indication that the user is registered for the event.

18. The non-transitory computer-readable medium of claim 17, wherein the one or more instructions further cause the device to:

determine that the user is an internal user; and select the data source based on the user being an internal user.

19. The non-transitory computer-readable medium of claim 17, wherein the one or more instructions further cause the device to:

determine that the user is an external user; and select the data source based on the user being an external user.

20. The non-transitory computer-readable medium of claim 17, wherein the data source is associated with a machine learning model that predicts preferences for users.

* * * * *